(12) United States Patent
Hasegawa et al.

(10) Patent No.: US 9,066,093 B2
(45) Date of Patent: Jun. 23, 2015

(54) DISPLAY PANEL MODULE, SEMICONDUCTOR INTEGRATED CIRCUIT, DRIVING METHOD OF PIXEL ARRAY SECTION, AND ELECTRONIC DEVICE

(75) Inventors: Hiroshi Hasegawa, Kanagawa (JP); Teppei Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1406 days.

(21) Appl. No.: 12/458,710

(22) Filed: Jul. 21, 2009

(65) Prior Publication Data

US 2010/0033462 A1 Feb. 11, 2010

(30) Foreign Application Priority Data

Aug. 8, 2008 (JP) ................................. 2008-204943

(51) Int. Cl.
*G09G 3/36* (2006.01)
*H04N 13/04* (2006.01)

(52) U.S. Cl.
CPC ....... *H04N 13/0497* (2013.01); *H04N 13/0438* (2013.01)

(58) Field of Classification Search
CPC .......... G09G 2330/021; G09G 233/02; G09G 3/3696; G09G 2300/0842; G09G 3/3233; G09G 2320/043; G09G 2330/02; G09G 3/3648; G09G 3/3688
USPC .................................... 345/76–102, 204–214
See application file for complete search history.

(56) References Cited

U.S. PATENT DOCUMENTS

| 6,445,833 | B1 * | 9/2002 | Murata et al. ................. 382/285 |
| 2004/0239599 | A1 * | 12/2004 | Koyama ........................... 345/76 |
| 2004/0263436 | A1 * | 12/2004 | Okuda ............................. 345/76 |
| 2005/0104818 | A1 * | 5/2005 | Kwak et al. ..................... 345/76 |
| 2005/0151830 | A1 * | 7/2005 | Yamazaki ....................... 347/238 |
| 2006/0192776 | A1 * | 8/2006 | Nomura et al. ................ 345/419 |

(Continued)

FOREIGN PATENT DOCUMENTS

| JP | 10-214060 A | 8/1998 |
| JP | 10-312173 A | 11/1998 |

(Continued)

OTHER PUBLICATIONS

Japanese Office Action issued Aug. 17, 2010 for corresponding Japanese Application No. 2008-204942.

(Continued)

*Primary Examiner* — Kevin Nguyen
*Assistant Examiner* — Mansour M Said
(74) *Attorney, Agent, or Firm* — Fishman Stewart Yamaguchi PLLC

(57) ABSTRACT

A display panel module includes: a pixel array section in which a sub-pixel formed by a self-luminous element of a current-driven type and a pixel circuit configured to drive and control the self-luminous element is arranged in a form of a matrix; a signal line driving section configured to drive a signal line; a writing control line driving section configured to control writing of a potential appearing in the signal line to the sub-pixel; and a power supply controlling section configured to control supply of driving power to the sub-pixel and stop of the supply of the driving power; wherein when either of a two-dimensional image and a three-dimensional image is displayed, the signal line driving section, the writing control line driving section, and the power supply controlling section operate in common driving timing set such that display periods of adjacent frames do not overlap each other.

14 Claims, 34 Drawing Sheets

(56) References Cited

U.S. PATENT DOCUMENTS

| | | | |
|---|---|---|---|
| 2007/0035483 A1* | 2/2007 | Chang | 345/76 |
| 2007/0242068 A1 | 10/2007 | Han et al. | |
| 2008/0001861 A1* | 1/2008 | Asano et al. | 345/77 |
| 2008/0030495 A1* | 2/2008 | Shirasaki et al. | 345/214 |
| 2008/0174848 A1* | 7/2008 | Kim et al. | 359/256 |
| 2009/0040243 A1* | 2/2009 | Hisada et al. | 345/690 |

FOREIGN PATENT DOCUMENTS

| | | |
|---|---|---|
| JP | 2003-122303 A | 4/2003 |
| JP | 2004-004638 A | 1/2004 |
| JP | 2006-284716 A | 10/2006 |
| JP | 2006-301250 A | 11/2006 |
| JP | 2006-330323 A | 12/2006 |
| JP | 2007-286623 | 11/2007 |
| JP | 2010-039398 A | 2/2010 |
| JP | 2010-039399 A | 2/2010 |

OTHER PUBLICATIONS

Japanese Office Action issued Oct. 18, 2011 for corresponding Japanese Application No. 2088-204943.

* cited by examiner

Background Art

FIG.2
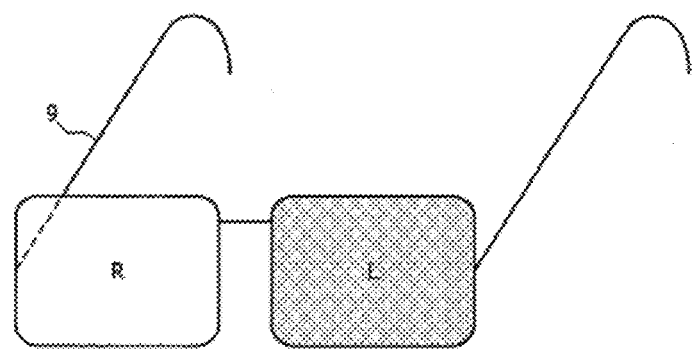
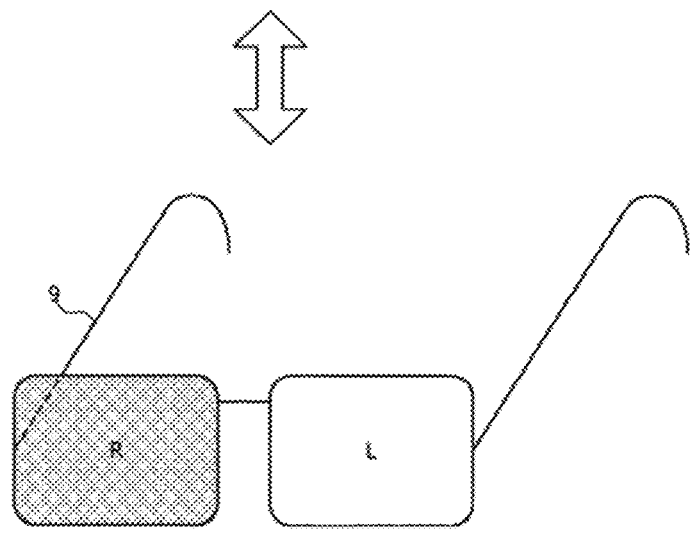
Background Art

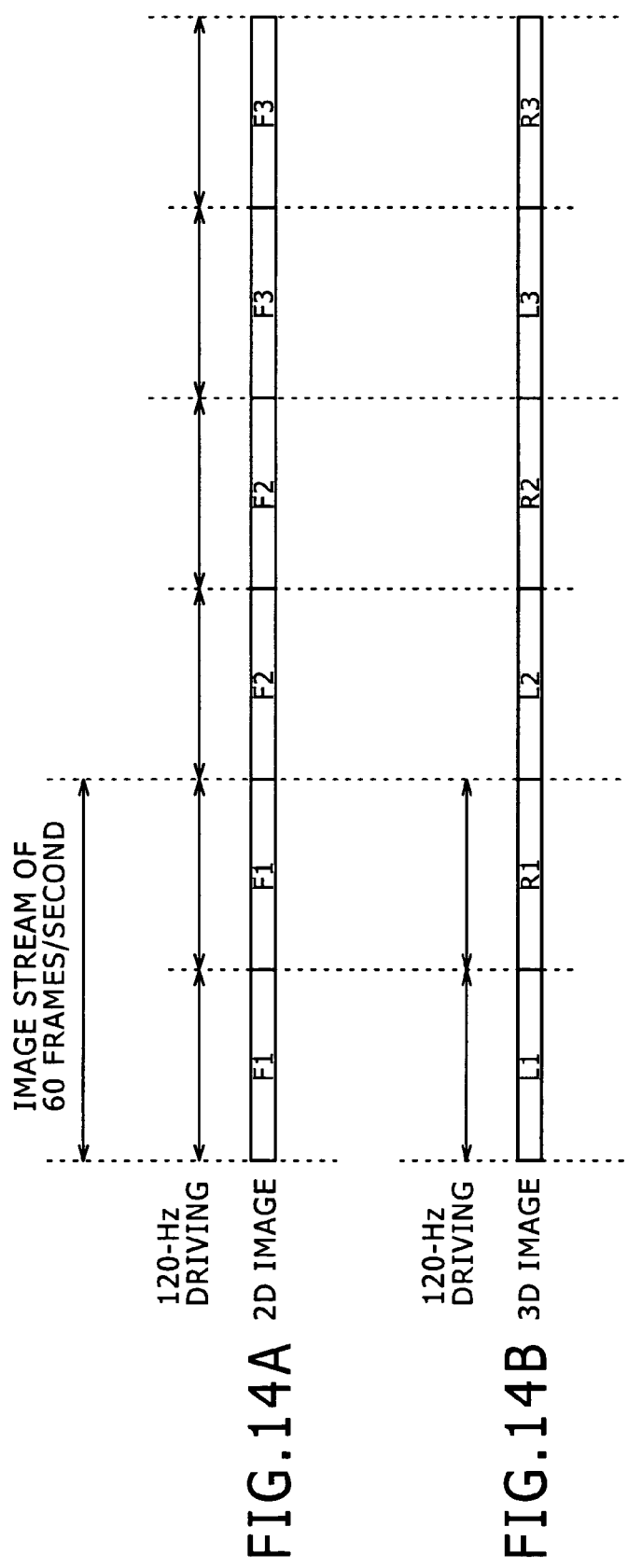

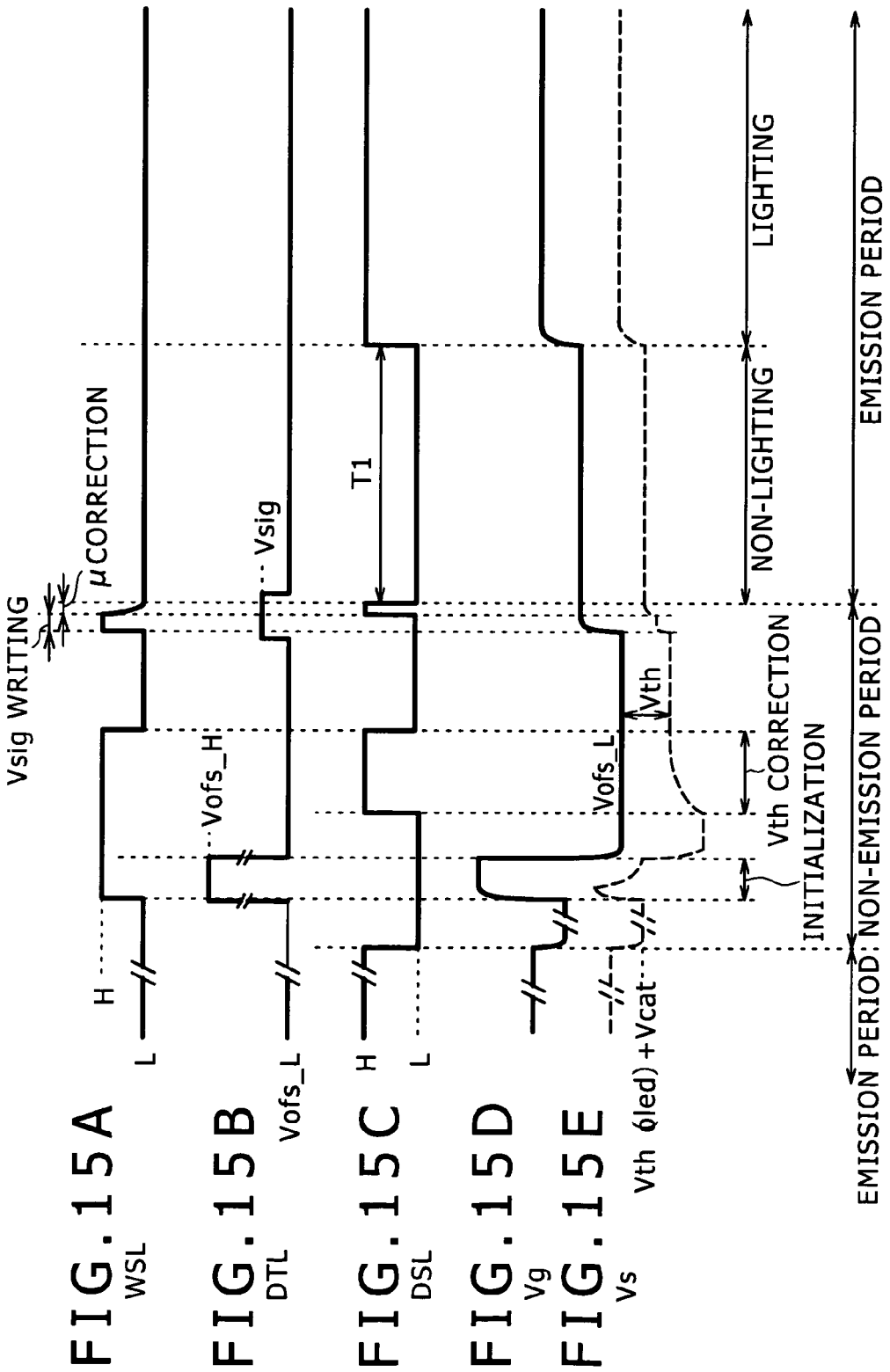

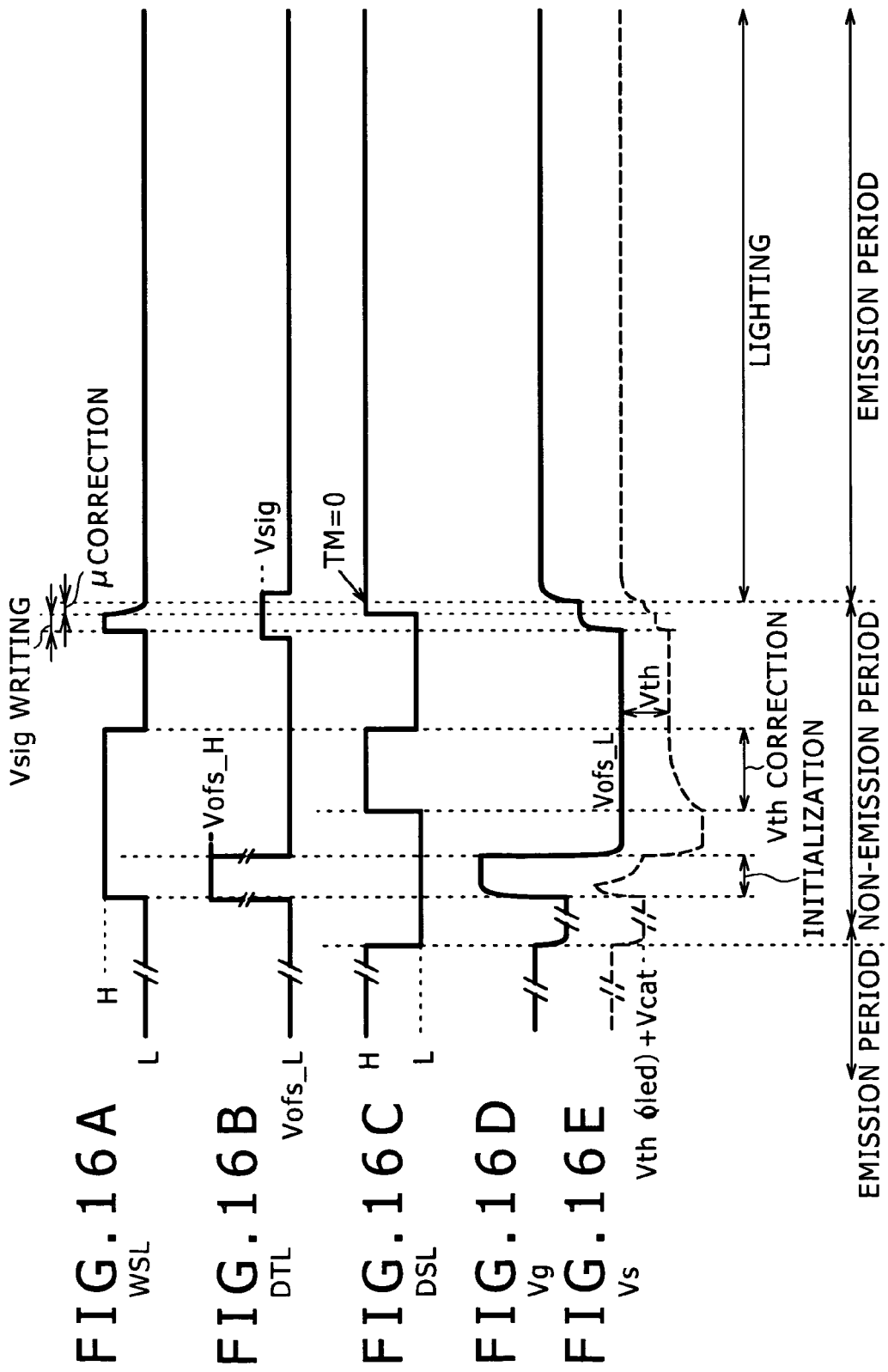

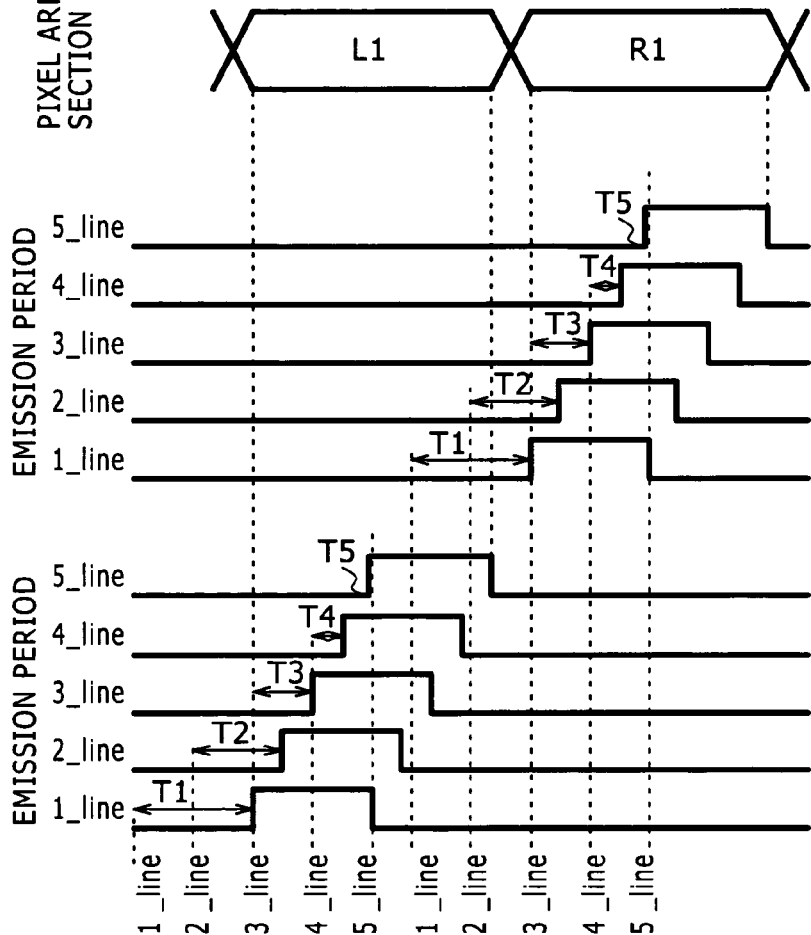
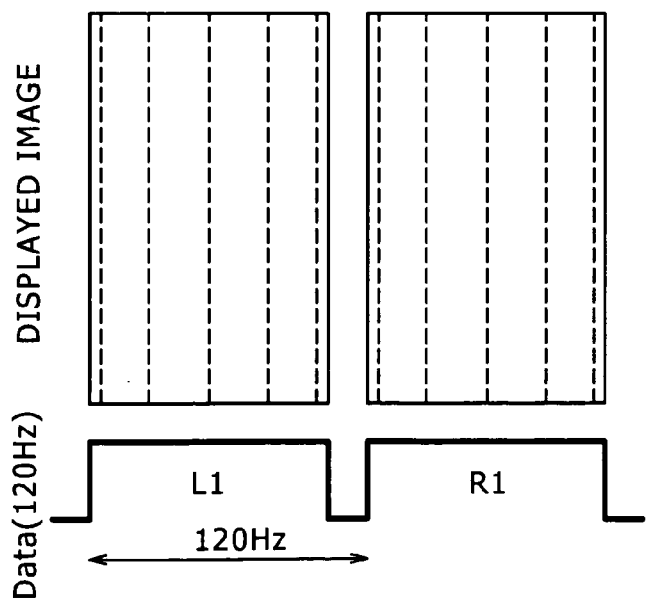

DISPLAY PANEL MODULE, SEMICONDUCTOR INTEGRATED CIRCUIT, DRIVING METHOD OF PIXEL ARRAY SECTION, AND ELECTRONIC DEVICE

BACKGROUND OF THE INVENTION

1. Field of the Invention

The invention described in the present specification relates to a driving technique of a pixel circuit for driving a self-luminous element of a current-driven type. Incidentally, the invention proposed in the present specification has an aspect as a display panel module, a semiconductor integrated circuit, a driving method of a pixel array section, and an electronic device including the display panel module.

2. Description of the Related Art

To this day, the display panel module has spread as a display device for images taken from a single visual point (which images will hereinafter be referred to as "two-dimensional images"). These days, however, development of display devices capable of displaying an image taken using a binocular parallax (which image will hereinafter be referred to as a "three-dimensional image") and making a user perceive the image as a stereoscopic image is under way. However, two-dimensional images constitute overwhelmingly large amounts of existing contents.

It is thus considered that display panel modules in the future will need a mechanism capable of displaying both two-dimensional images and three-dimensional images.

FIG. 1 shows an example of construction of an imaging system capable of displaying both a two-dimensional image and a three-dimensional image. This imaging system 1 is suitable for use when a two-dimensional image and a three-dimensional image are desired to be displayed in a same screen size.

The imaging system 1 includes an image reproducer 3, a display device 5, an infrared light emitting section 7, and eyeglasses 9 provided with liquid crystal shutters. Of these components, the image reproducer 3 is a video device having a function of reproducing both two-dimensional images and three-dimensional images. The image reproducer 3 includes not only so-called image reproducing devices but also set-top boxes and computers. The display device 5 is a device for outputting input image data. The display device 5 includes not only so-called television receivers but also monitors.

The infrared light emitting section 7 is a device for notifying the eyeglasses 9 provided with the liquid crystal shutters of timing of displaying an image for a left eye and an image for a right eye or timing of switching the display at a time of displaying a three-dimensional image. FIG. 1 shows an example in which the infrared light emitting section 7 is disposed around the center of an upper side frame part of the display device 5. The eyeglasses 9 provided with the liquid crystal shutters are one of accessories that a user is requested to wear at a time of display of a three-dimensional image. Of course, the eyeglasses 9 provided with the liquid crystal shutters do not need to be worn by a user at a time of display of a two-dimensional image.

FIG. 2 shows an image of operation of the eyeglasses 9 provided with the liquid crystal shutters. In the figure, a picture in which a hollow inside of a frame is shown indicates an opened state of the liquid crystal shutter, that is, a state in which external light can pass through. A picture in which a hatched inside of a frame is shown indicates a closed state of the liquid crystal shutter, that is, a state in which external light does not pass through.

As shown in FIG. 2, during display of a three-dimensional image, the two liquid crystal shutters are not simultaneously set in an opened state, but only one of the liquid crystal shutters is controlled to be in an opened state in such a manner as to be interlocked with the changing of a displayed image. Specifically, only the liquid crystal shutter for the left eye is controlled to be in an opened state during display of an image for the left eye, and only the liquid crystal shutter for the right eye is controlled to be in an opened state during display of an image for the right eye. The imaging system 1 makes it possible to view a stereoscopic image by the complementary operation of opening and closing the liquid crystal shutters.

FIG. 3 shows an equivalent circuit of an electronic circuit part of the eyeglasses 9 provided with the liquid crystal shutters. The eyeglasses 9 provided with the liquid crystal shutters include a battery 11, an infrared light receiving section 13, a shutter driving section 15, and the liquid crystal shutters 17 and 19.

The battery 11 is a lightweight and small battery such as a button battery, for example. The infrared light receiving section 13 is for example an electronic part attached to a front part of the eyeglasses to receive infrared light on which display image switching information is superimposed.

The shutter driving section 15 is an electronic part that performs switching control on the opening and closing of the liquid crystal shutter 17 for the right eye and the liquid crystal shutter 19 for the left eye in such a manner as to be synchronized with display images on the basis of the received switching information.

SUMMARY OF THE INVENTION

Japanese Patent Laid-Open No. 2007-286623 (hereinafter referred to as Patent Document 1) discloses an imaging system that includes a driving circuit for displaying a two-dimensional image and a driving circuit for displaying a three-dimensional image, and which changes the driving circuit used to drive a display panel according to the changing of a display image.

FIGS. 4A and 4B represent a driving system disclosed in Patent Document 1. Incidentally, FIGS. 4A and 4B represent relation of driving periods with attention directed to a certain horizontal line.

However, FIGS. 4A and 4B represent relation of operation when a two-dimensional image and a three-dimensional image taken at a rate of 60 frames/second are displayed on a display panel. Incidentally, suppose that the display panel is driven and controlled by an active matrix driving system.

FIG. 4A represents timing of processing two-dimensional image data with attention directed to a certain horizontal line. As shown in FIG. 4A, at a time of input of a two-dimensional image, a processing operation from the writing of a frame image F to lighting is performed during the period of 1/60 [seconds].

FIG. 4B represents timing of processing three-dimensional image data with attention directed to a certain horizontal line. A period shown by an outline is a processing period for an image L for the left eye or an image R for the right eye, and a period shown by solid black is a processing period for a black screen. As shown in FIG. 4B, at a time of input of a three-dimensional image, a processing operation from the writing of an image L for the left eye to lighting, a processing operation from the writing of a black screen to lighting, a processing operation from the writing of an image R for the right eye to lighting, and a processing operation from the writing of a black screen to lighting are performed in units of 1/240 [seconds].

In this case, a processing period for a black screen is inserted between a processing period for an image L for the left eye and an image R for the right eye in order to prevent the left and right images from being simultaneously displayed and mixed with each other on the screen. FIG. 5 represents principles of the operation. FIG. 5 shows relation between the processing timing of each horizontal line and a state of display as viewed from a user. Also in the case of FIG. 5, an outline part represents the processing period of an image for the left eye or an image for the right eye (which processing period is considered to be mainly a lighting period), and a solid black part represents the processing period of a black screen (which processing period is considered to be mainly a lighting period).

As shown in FIG. 5, the black screen insertion period allows the timing of starting display (lighting) of the image R for the right eye in a horizontal line of a first row to be delayed to a time after an end of display (lighting) of the image L for the left eye in a horizontal line of a last row. A period from the end of display (lighting) of the image L for the left eye in the horizontal line of the last row to the start of display (lighting) of the image R for the right eye in the horizontal line of the first row is allotted to a period for changing the opened and closed states of the liquid crystal shutters.

Patent Document 1 thus discloses driving techniques for displaying a three-dimensional image. However, this driving system demands the display panel to be driven at a speed (240 Hz) as high as four times a frame rate (60 Hz) of visually perceived frames. This means that parts of very high performance need to be employed for the pixel array section and the driving circuit for the pixel array section, and causes an increase in manufacturing cost.

In addition, as shown in FIG. 5, black screen display periods of the same length as display periods of a three-dimensional image are necessary. Thus, the existing techniques that insert a black screen inevitably decrease screen luminance.

In addition, as with the driving system shown in Patent Document 1, a method of changing the driving system at a time of displaying a two-dimensional image and a time of displaying a three-dimensional image needs a functional constitution that detects a difference in image format and which changes a driving method. Further, the driving system shown in the quoted Patent Document 1 needs both a driving circuit for a two-dimensional image and a driving circuit for a three-dimensional image. Thus, in addition to an increase in the number of parts, a circuit layout becomes complex.

Accordingly, the inventor et al. propose a display panel module including: (a) a pixel array section in which a sub-pixel formed by a self-luminous element of a current-driven type and a pixel circuit for driving and controlling the self-luminous element is arranged in a form of a matrix; (b) a signal line driving section configured to drive a signal line; (c) a writing control line driving section configured to control writing of a potential appearing in the signal line to the sub-pixel; and (d) a power supply controlling section configured to control supply of driving power to the sub-pixel and stop of the supply of the driving power.

In the proposed display panel module, when either of a two-dimensional image and a three-dimensional image is displayed, the signal line driving section, the writing control line driving section, and the power supply controlling section operate in common driving timing set such that display periods of adjacent frames do not overlap each other.

In this case, it is desirable that the writing control line driving section control writing timing on a basis of a first scan clock, and that the power supply controlling section control timing of the supply of the driving power defining a lighting period of the self-luminous element on a basis of a second scan clock having a higher speed than the first scan clock.

Further, in this case, a waiting time from completion of writing of a signal potential in each horizontal line to a start of lighting is desirably set such that the waiting time of a first horizontal line in which the writing of a signal potential is completed first is longest, the waiting time of a second horizontal line in which the writing of a signal potential is completed last is shortest, and length of the waiting time of each horizontal line positioned between the first horizontal line and the second horizontal line is changed linearly according to positional relation to the first horizontal line and the second horizontal line.

Further, in this case, a cycle of the first scan clock is desirably set so as to coincide with a horizontal scanning cycle.

In addition, the inventor et al. propose a semiconductor integrated circuit including a driving circuit satisfying the above-described operating conditions. In addition, the inventor et al. propose a driving method of a pixel array section satisfying the above-described operating conditions. In addition, the inventor et al. propose an electronic device including the above-described display panel module. The electronic device in this case includes the display panel module, a system control section configured to control operation of an entire system, and an operating input section configured to receive an operating input to the system control section.

In the case of embodiments of the invention proposed by the inventor et al., each driving circuit can be operated in common driving timing when either of a two-dimensional image and a three-dimensional image is displayed. Thus, a need to provide a driving circuit for two-dimensional images and a driving circuit for three-dimensional images separately as in the existing techniques is eliminated. In addition, embodiments of the invention proposed by the inventor et al. eliminates a need for an operation of determining whether an input image is a two-dimensional image or a three-dimensional image. Thus, manufacturing cost can be reduced as compared with a display panel module adopting the existing techniques.

BRIEF DESCRIPTION OF THE DRAWINGS

FIG. 2 is a diagram of assistance in explaining a mode of operation of eyeglasses provided with liquid crystal shutters used to view a three-dimensional image;

FIGS. 14A and 14B are diagrams of assistance in explaining driving techniques for a two-dimensional image and a three-dimensional image;

FIGS. 15A, 15B, 15C, 15D, and 15E are diagrams showing relation between an example of driving waveforms and internal potentials of a sub-pixel;

FIGS. 16A, 16B, 16C, 16D, and 16E are diagrams showing relation between an example of driving waveforms and internal potentials of a sub-pixel;

FIGS. 17A, 17B, 17C, and 17D are diagrams of assistance in explaining relation between waiting times to a start of lighting and horizontal lines;

DETAILED DESCRIPTION OF THE PREFERRED EMBODIMENTS

Description will hereinafter be made of a case where embodiments of the present invention is applied to an organic EL panel module of an active matrix driving type.

Incidentally, well known or publicly known techniques in a pertinent technical field are applied to parts not specifically shown or described in the present specification. In addition, embodiments to be described below are each an embodiment of the invention, and the present invention is not limited to these embodiments.

(A) External Configuration

In the present specification, a display panel module is used with two kinds of meaning. One is a display panel module in which a pixel array section and a driving circuit (for example a signal line driving section, a writing control line driving section, a power supply control line driving section and the like) are formed on a substrate using a semiconductor process. The other is a display panel module in which a driving circuit manufactured as an application specific IC is mounted on a substrate having a pixel array section formed therein.

Figure 1:
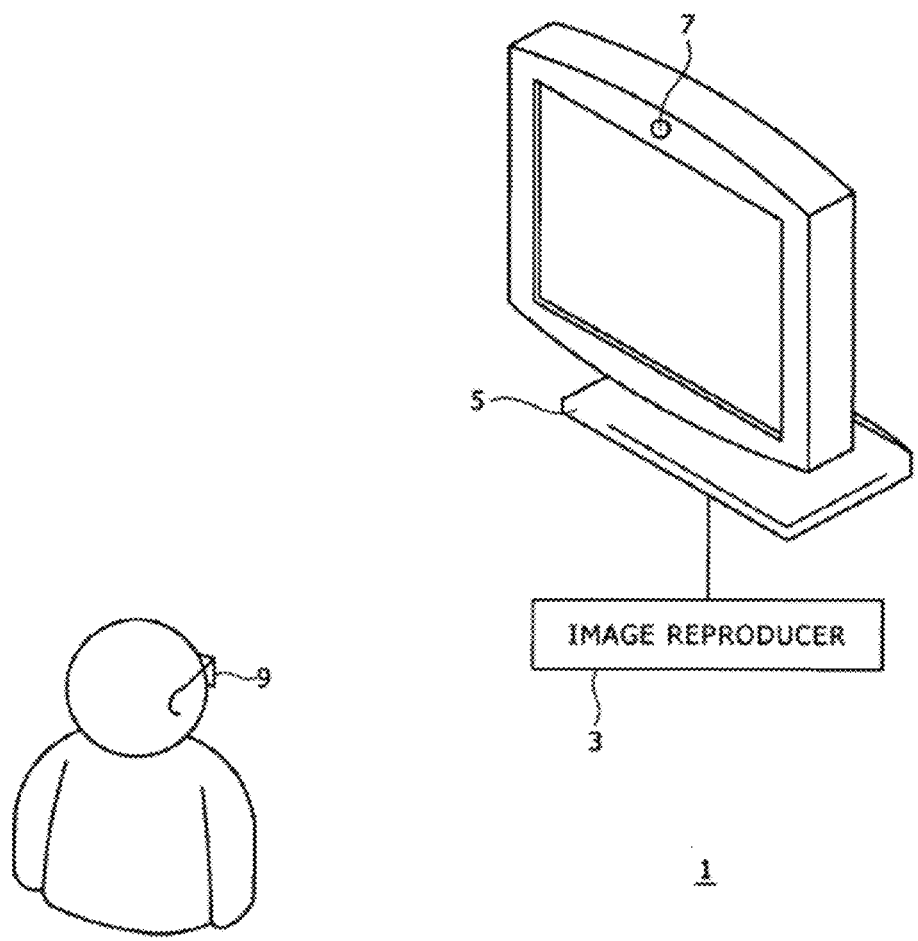
FIG. 1 is a conceptual diagram of an imaging system capable of displaying both a two-dimensional image and a three-dimensional image.
Figure 3:
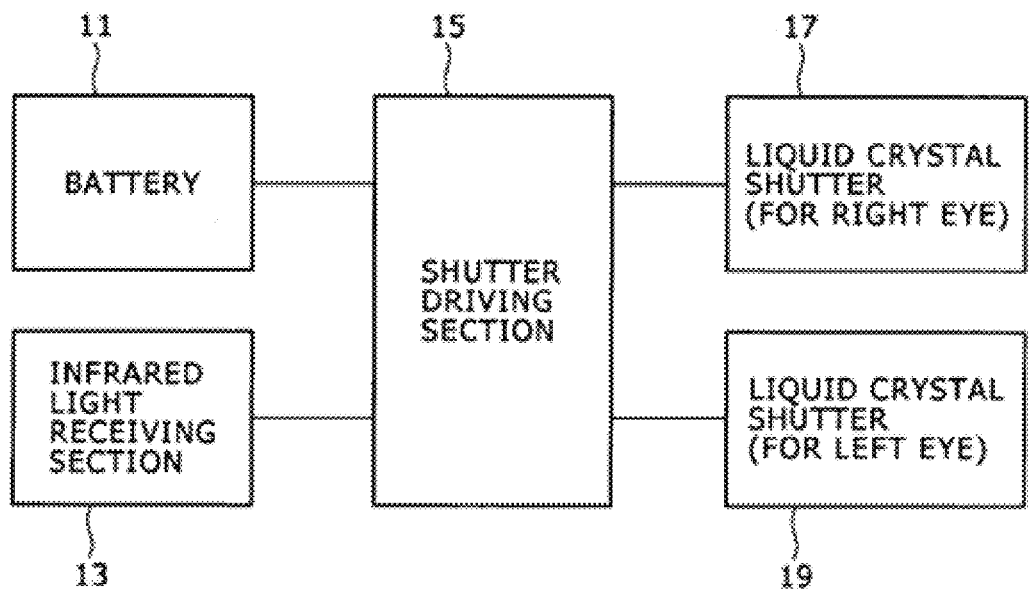
FIG. 3 is a diagram showing an equivalent circuit of an electronic function part of the eyeglasses provided with the liquid crystal shutters.
Figure 4:
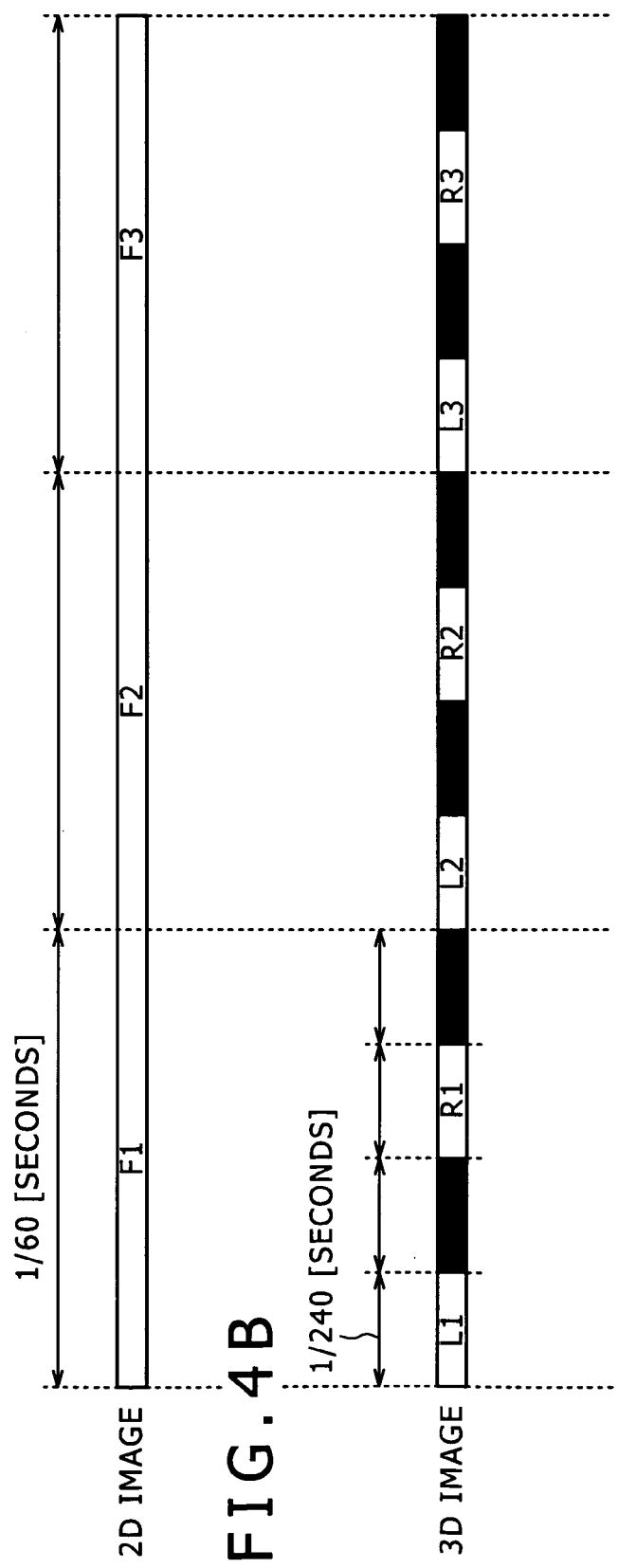
FIGS. 4A and 4B are diagrams of assistance in explaining driving techniques for a two-dimensional image and a three-dimensional image (existing example)
Figure 5:
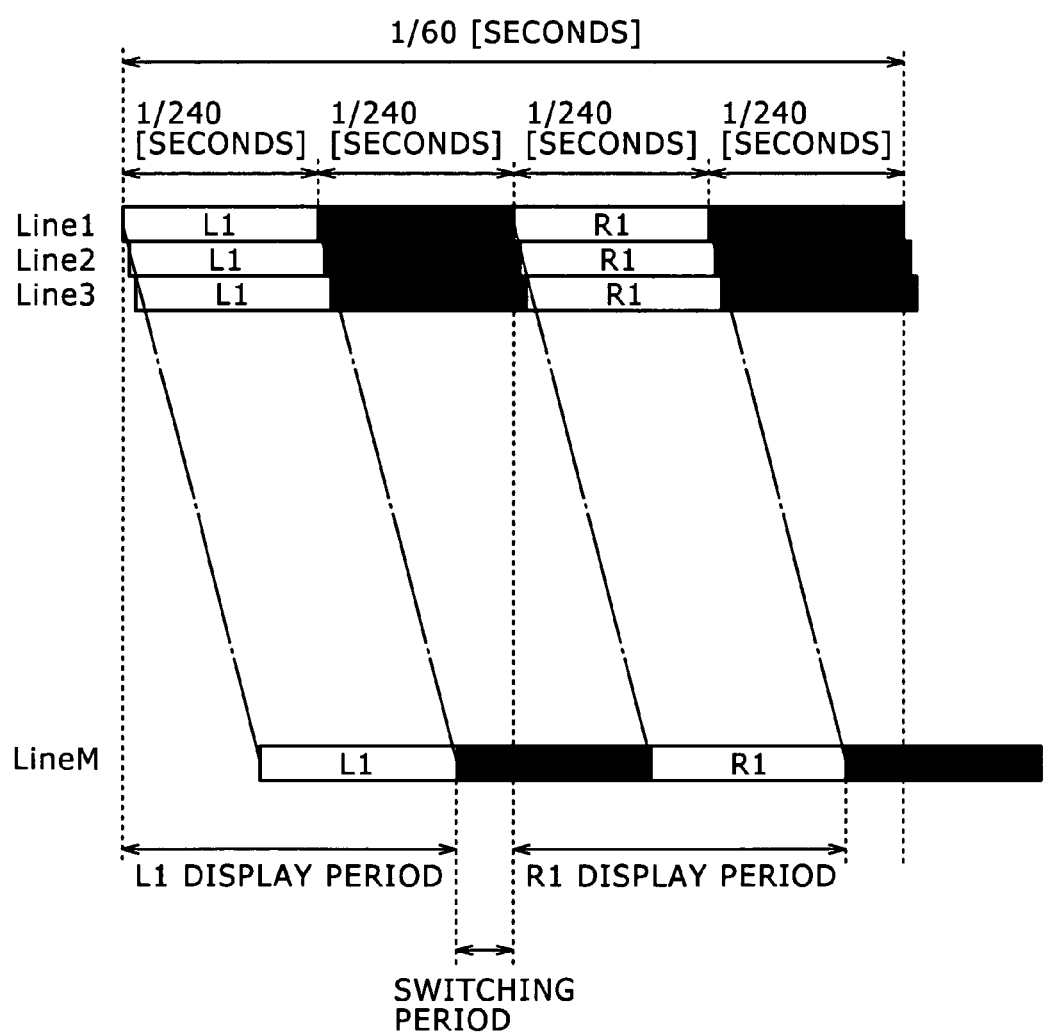
FIG. 5 is a diagram of assistance in explaining a relation between processing timing by horizontal line and display periods at a time of display of a three-dimensional image (existing example)
Figure 6:
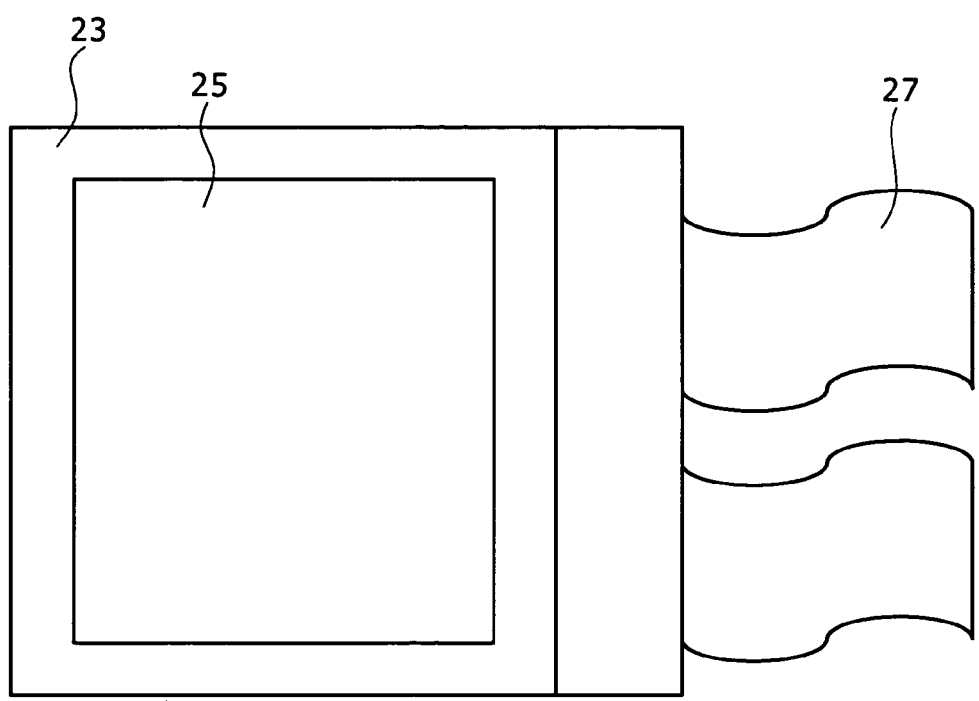
FIG. 6 is a diagram showing an example of external configuration of an organic EL panel module.

FIG. 6 shows an example of external configuration of an organic EL panel module. The organic EL panel module 21 has a structure formed by laminating a counter substrate 25 to a pixel array section forming region of a supporting substrate 23.

The supporting substrate 23 is formed by glass, plastic, or another base material. The counter substrate 25 also has glass, plastic, or another transparent member as a base material.

The counter substrate 25 is a member for sealing the surface of the supporting substrate 23 with a sealing material interposed between the counter substrate 25 and the supporting substrate 23.

Incidentally, it suffices to secure substrate transparency only on a light emitting side, and another substrate side may be an opaque substrate. In addition, the organic EL panel module 21 has an FPC (Flexible Printed Circuit) 27 for inputting an external signal and driving power.

(B) First Embodiment (B-1) System Configuration

Figure 7:
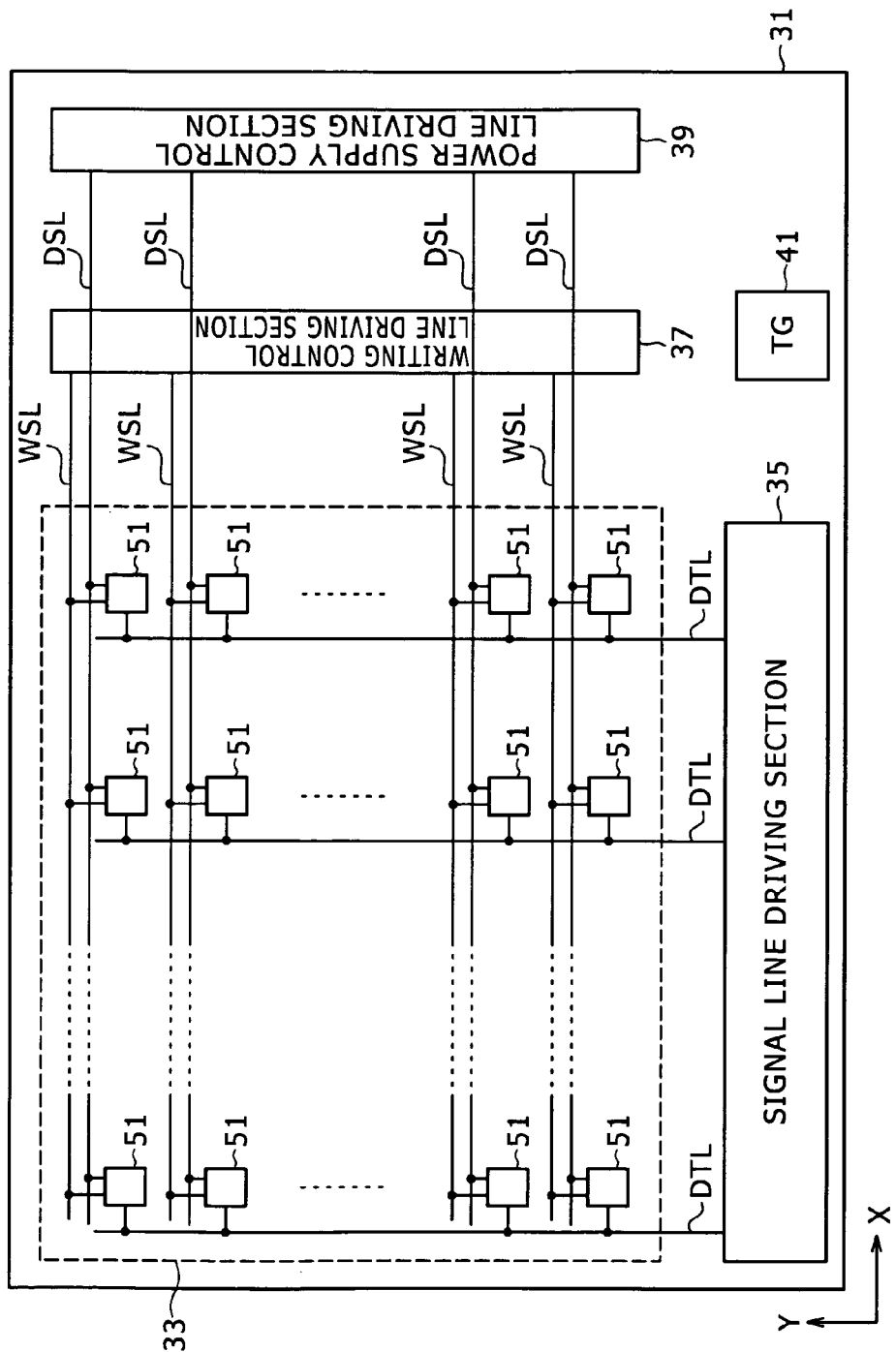
FIG. 7 is a diagram of assistance in explaining the system structure of the organic EL panel module.

FIG. 7 shows an example of system configuration of an organic EL panel module 31 according to the present embodiment.

The organic EL panel module 31 shown in FIG. 7 includes a pixel array section 33 as well as a signal line driving section 35, a writing control line driving section 37, a power supply control line driving section 39, and a timing generator 41, which are a driving circuit for driving the pixel array section 33. Of these components, the power supply control line driving section 39 corresponds to a "power supply controlling section" in claims.

(a) Pixel Array Section

Figure 8:
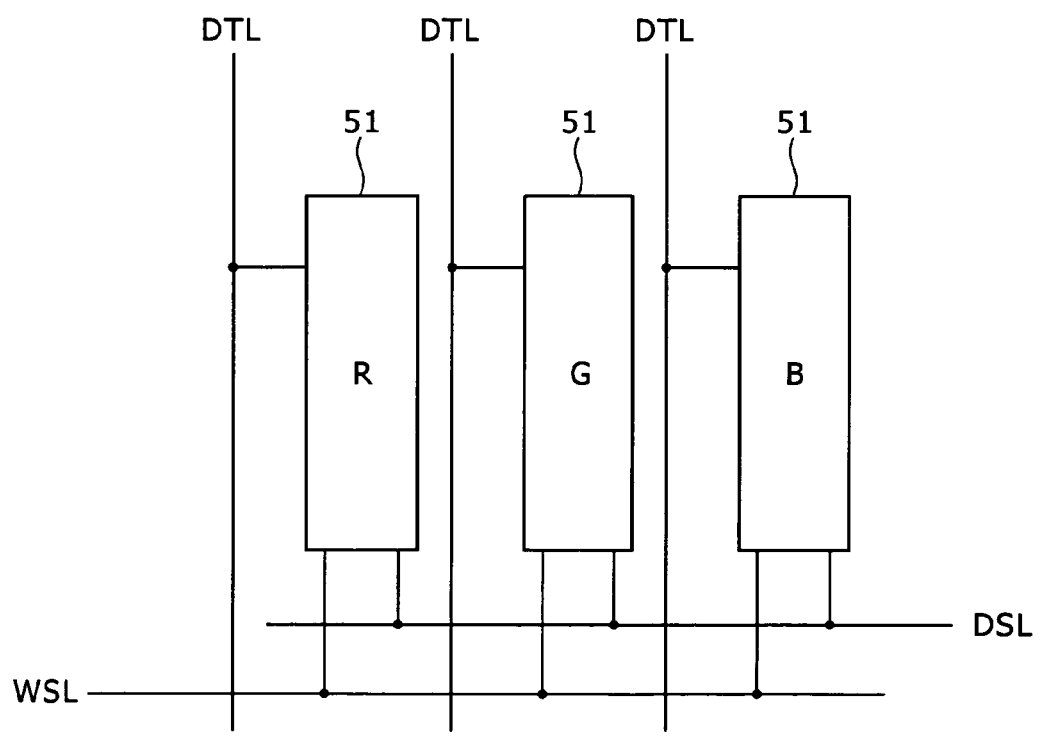
FIG. 8 is a diagram of assistance in explaining an arrangement of pixels.

In the case of the present embodiment, in the pixel array section 33, one pixel forming a white unit is arranged at a specified resolution in each of a vertical direction and a horizontal direction within a screen. FIG. 8 shows an arrangement structure of sub-pixels 51 forming a white unit. As shown in FIG. 8, the white unit is formed as an aggregate of an R (red) pixel 51, a G (green) pixel 51, and a B (blue) pixel 51.

Letting M be a vertical resolution of the pixel array section 33 and N be a horizontal resolution of the pixel array section 33, a total number of sub-pixels of the pixel array section 33 is given by M×N×3.

Figure 9:
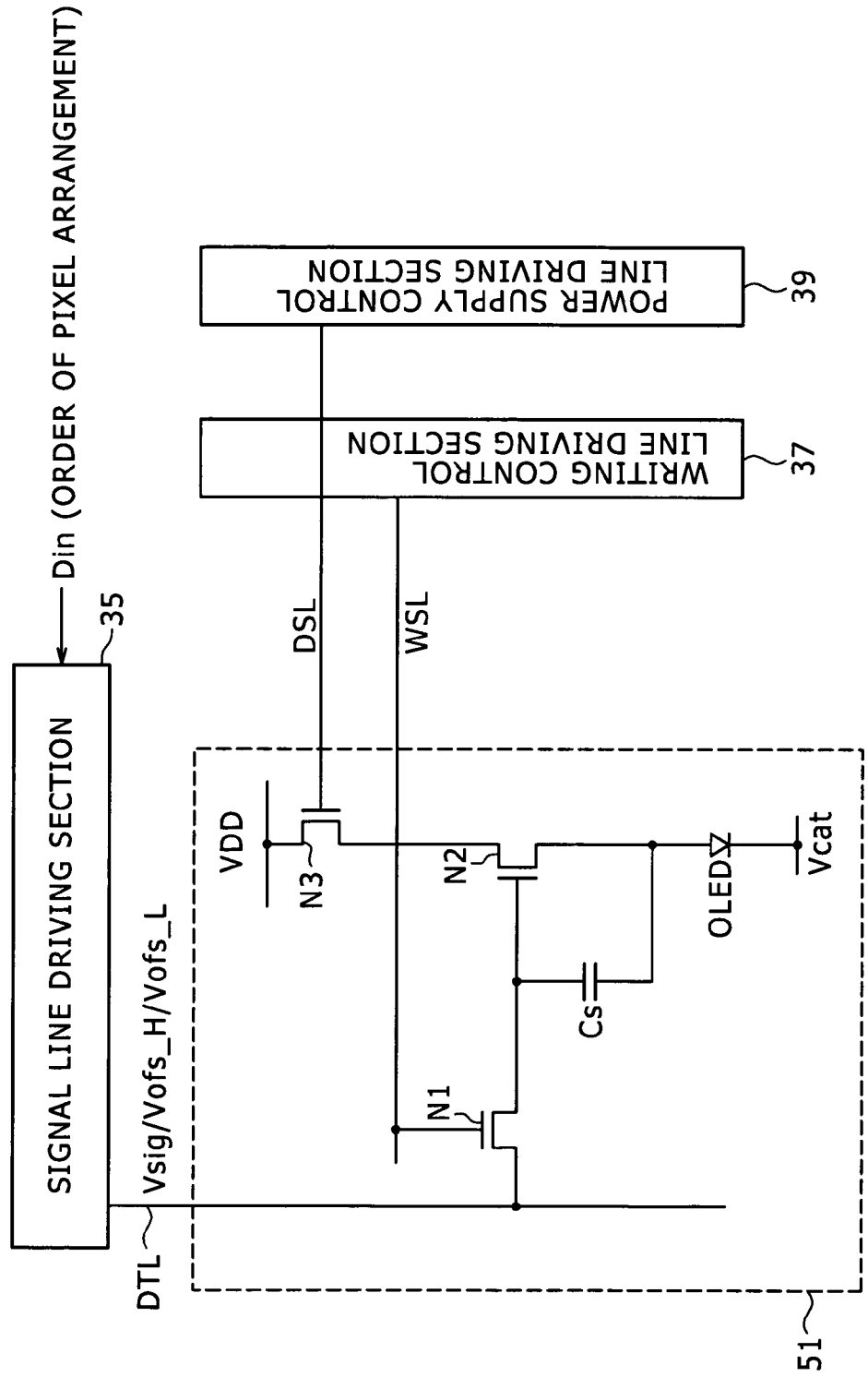
FIG. 9 is a diagram of assistance in explaining an example of pixel structure of a sub-pixel.

FIG. 9 shows a relation of connection between a sub-pixel 51 as a minimum unit of a pixel structure forming the pixel array section 33 and a driving circuit part of the sub-pixel 51.

In the present embodiment, as shown in FIG. 9, the sub-pixel 51 includes N-channel type thin film transistors N1, N2, and N3, a storage capacitor Cs for retaining gradation information, and an organic EL element OLED. Incidentally, the thin film transistor N1 is a switch element for controlling the writing of a potential appearing in a signal line DTL (which potential will hereinafter be referred to as a "signal line potential"). The thin film transistor N1 will hereinafter be referred to as a sampling transistor N1.

The thin film transistor N2 is a switch element for supplying a driving current of a magnitude corresponding to a potential retained by the storage capacitor Cs to the organic EL element OLED. The thin film transistor N2 will hereinafter be referred to as a driving transistor N2.

The thin film transistor N3 is a switch element for controlling the supply and the stopping of the supply of a driving voltage VDD to one of main electrodes of the driving transistor N2. The thin film transistor N3 will hereinafter be referred to as a power supply controlling transistor N3.

(b) Configuration of Signal Line Driving Section

The signal line driving section 35 is a circuit device for driving the signal line DTL. Each signal line DTL is arranged so as to extend in a vertical direction (Y-direction) of the screen, and 3×N signal lines DTL are arranged in a horizontal direction (X-direction) of the screen. In the present embodiment, the signal line driving section 35 drives the signal line DTL by three values of a characteristic correcting potential Vofs_L, an initializing potential Vofs_H, and a signal potential Vsig.

Incidentally, the characteristic correcting potential Vofs_L is for example a potential corresponding to a black level of pixel gradation. The characteristic correcting potential Vofs_L is used for an operation of correcting variation in threshold voltage Vth of the driving transistor N2 (which operation will hereinafter be referred to as a threshold value correcting operation).

The initializing potential Vofs_H is a potential for cancelling a voltage retained by the storage capacitor Cs. An operation of thus cancelling the voltage retained by the storage capacitor Cs will hereinafter be referred to as an initializing operation.

Incidentally, the initializing potential Vofs_H is set higher than a maximum value that can be assumed by the signal potential Vsig corresponding to a pixel gradation. Thereby the retained voltage can be cancelled regardless of the signal potential Vsig given in a preceding frame period.

The signal line driving section 35 in the present embodiment operates in same driving timing both at a time of display of a two-dimensional image and at a time of display of a three-dimensional image.

Figure 10:
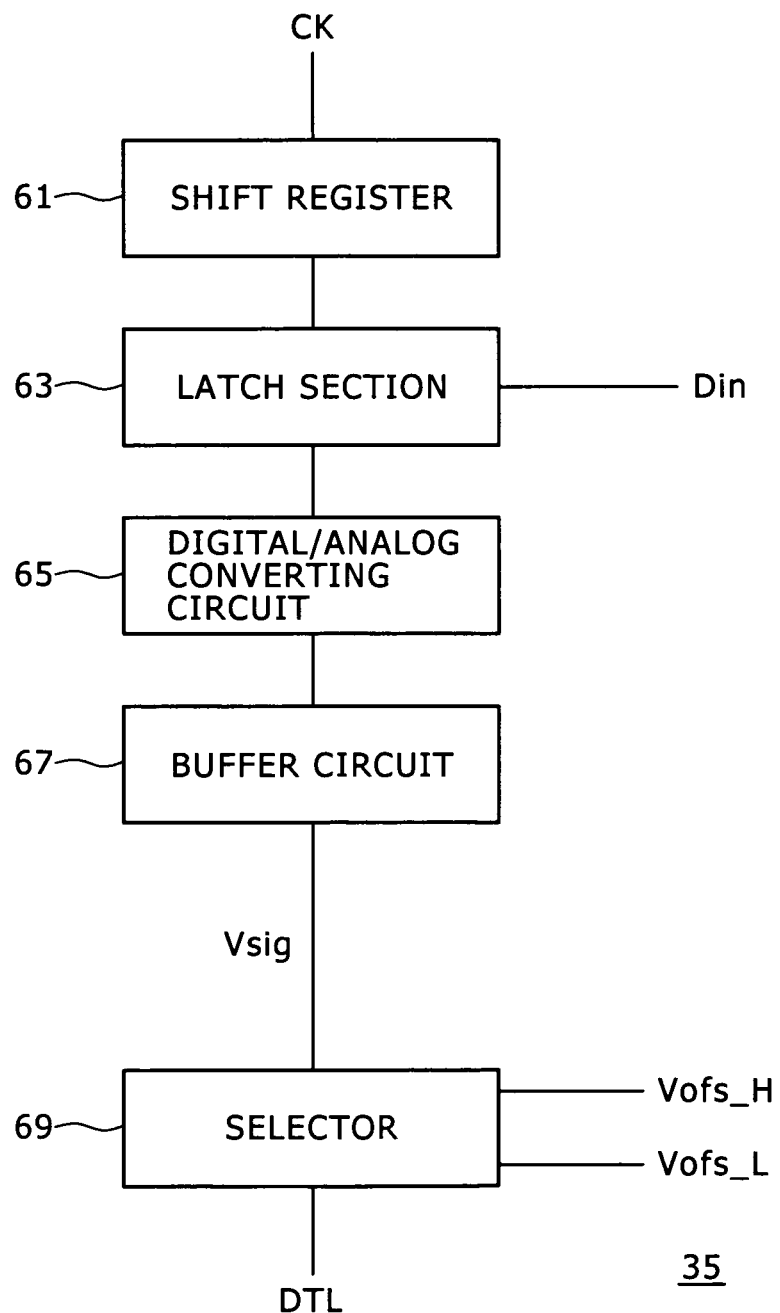
FIG. 10 is a diagram showing an example of circuit configuration of a signal line driving section.

FIG. 10 shows an example of internal configuration of the signal line driving section 35. The signal line driving section 35 includes a shift register 61, a latch section 63, a digital/analog converting circuit 65, a buffer circuit 67, and a selector 69.

The shift register 61 is a circuit device for giving timing of capturing pixel data Din on the basis of a clock signal CK. In the present embodiment, the shift register 61 is formed by at least 3×N delay stages corresponding to the number of signal lines DTL. Thus, the clock signal CK has 3×N pulses within one horizontal scanning period.

The latch section 63 is a storage circuit for capturing the pixel data Din into a corresponding storage area on the basis of a timing signal output from the shift register 61.

The digital/analog converting circuit 65 is a circuit device for converting the pixel data Din captured into the latch section 63 to an analog signal voltage Vsig. Incidentally, the conversion characteristics of the digital/analog converting circuit 65 are defined by an H-level reference potential Vref_H and an L-level reference potential Vref_L.

The buffer circuit 67 is a circuit device for converting a signal amplitude to a signal level suitable for panel driving.

Figure 11:
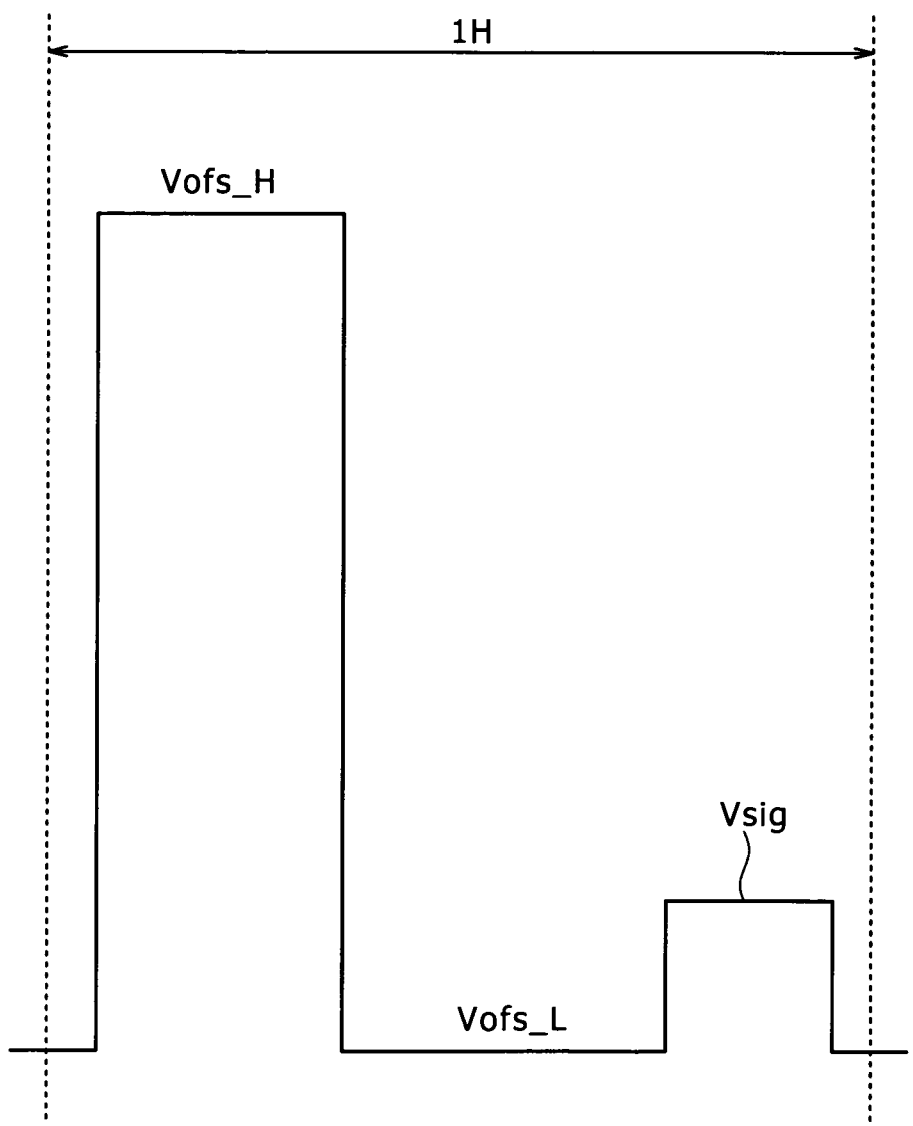
FIG. 11 is a diagram showing an example of the driving waveform of a signal line.

The selector 69 is a circuit device for selectively outputting one of the signal potential Vsig corresponding to a pixel gradation, the threshold value correcting potential Vofs_L, and the initializing potential Vofs_H within one horizontal scanning period. FIG. 11 shows an example of output of the signal line potentials by the, selector 69. In the present embodiment, the selector 69 outputs the initializing potential Vofs_H, the threshold value correcting potential Vofs_L, and the signal potential Vsig in this order.

(c) Configuration of Writing Control Line Driving Section

The writing control line driving section 37 is a driving device for controlling the writing of a signal potential to the sub-pixel 51 on a line-sequential basis through a writing control line WSL. Incidentally, the writing control line WSL is arranged so as to extend in the horizontal direction (X-direction) of the screen, and M writing control lines WSL are arranged in the vertical direction (Y-direction) of the screen.

The control line driving section 37 is a circuit device for specifying timing of performing an initializing operation, a threshold value correcting operation, a signal potential writing operation, and a mobility correcting operation in a horizontal line unit. The control line driving section 37 in the present embodiment also operates in same driving timing both at a time of display of a two-dimensional image and at a time of display of a three-dimensional image.

Figure 12:
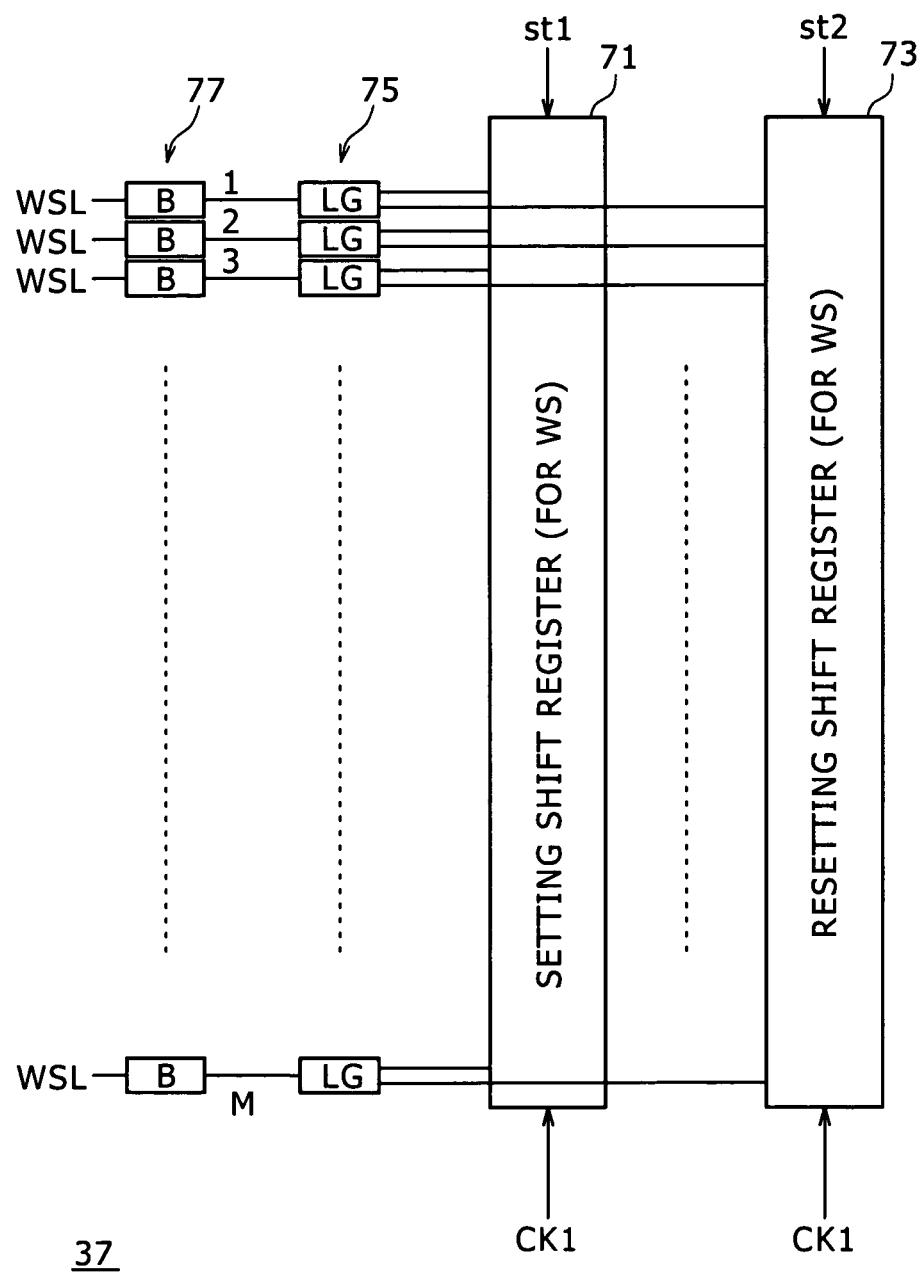
FIG. 12 is a diagram showing an example of circuit configuration of a writing control line driving section.

FIG. 12 shows an example of circuit configuration of the control line driving section 37. The control line driving section 37 is formed by a setting shift register 71, a resetting shift register 73, logic gates 75, and buffer circuits 77.

The setting shift register 71 is formed by M delay stages corresponding to the vertical resolution. The setting shift register 71 operates on the basis of a first shift clock CK1 synchronous with a horizontal scanning clock. Each time the first shift clock CK1 is input, the setting shift register 71 transfers a setting pulse to a next delay stage. The first shift clock CK1 in this case corresponds to a "first scan clock" in claims. Incidentally, transfer start timing is given by a start pulse st1.

The resetting shift register 73 is also formed by M delay stages corresponding to the vertical resolution. Similarly, the resetting shift register 73 operates on the basis of the first shift clock CK1 synchronous with the horizontal scanning clock. Each time the first shift clock CK1 is input, the resetting shift register 73 transfers a resetting pulse to a next delay stage. Transfer start timing is given by a start pulse st2.

The logic gates 75 are a circuit device for generating a pulse signal having a pulse width from the input of the setting pulse to the input of the resetting pulse. The logic gates 75 are arranged by the number of writing control lines WSL. Incidentally, when a plurality of writing timings need to be given within one horizontal scanning period, it suffices to obtain the waveform of a logical product of a pulse waveform giving the plurality of writing timings and the pulse signal defined by the setting pulse and the resetting pulse. In this case, the setting pulse and the resetting pulse have a role of identifying a horizontal line to which the plurality of writing timings are output.

The buffer circuits 77 are a circuit device for level-converting a control pulse at a logic level to a control pulse at a driving level. The buffer circuits 77 need to have a capability of simultaneously driving N sub-pixels connected to a writing control line WSL.

(d) Configuration of Power Supply Control Line Driving Section

The power supply control line driving section 39 is a driving device for controlling the supply and the stopping of the supply of a driving power VDD to the sub-pixel 51 through a power supply control line DSL. Incidentally, the power supply control line DSL is arranged so as to extend in the horizontal direction (X-direction) of the screen, and M power supply control lines DSL are arranged in the vertical direction (Y-direction) of the screen.

The power supply control line driving section 39 operates to supply the driving power VDD for periods of performance of threshold value correcting operation and mobility correcting operation in a non-emission period. Incidentally, this control operation is performed in synchronism with the writing control operation of the writing control line driving section 37. Thus, the operation of the power supply control line driving section 39 in the non-emission period is performed on the basis of the first shift clock CK1 synchronous with the horizontal scanning clock.

In addition, the power supply control line driving section 39 operates to supply the driving power VDD only for a period of lighting control of the organic EL element OLED in an emission period. In the present embodiment, the control operation in the emission period by the power supply control line driving section 39 is performed at a scan speed higher than a scan speed during the non-emission period. That is, the control operation is performed using a second shift clock CK2 having a higher speed than the first shift clock CK1. The second shift clock CK2 in this case corresponds to a "second scan clock" in claims.

The scan speed of the control pulse in the emission period is thus increased in order to compress the length of a period from a lighting start (display start) in an upper end part of the screen to a lighting end (display end) in a lower end part of the screen as compared with an existing technique. Incidentally, the higher a ratio of the second shift clock CK2 to the first shift clock CK1, the more the expansion of the emission period between a top and a bottom within the screen can be compressed.

In the present embodiment, the second shift clock CK2 is set to be 2.77 times the first shift clock CK1 (one horizontal scanning clock).

The power supply control line driving section 39 in the present embodiment also operates in same driving timing both at a time of display of a two-dimensional image and at a time of display of a three-dimensional image.

Figure 13:
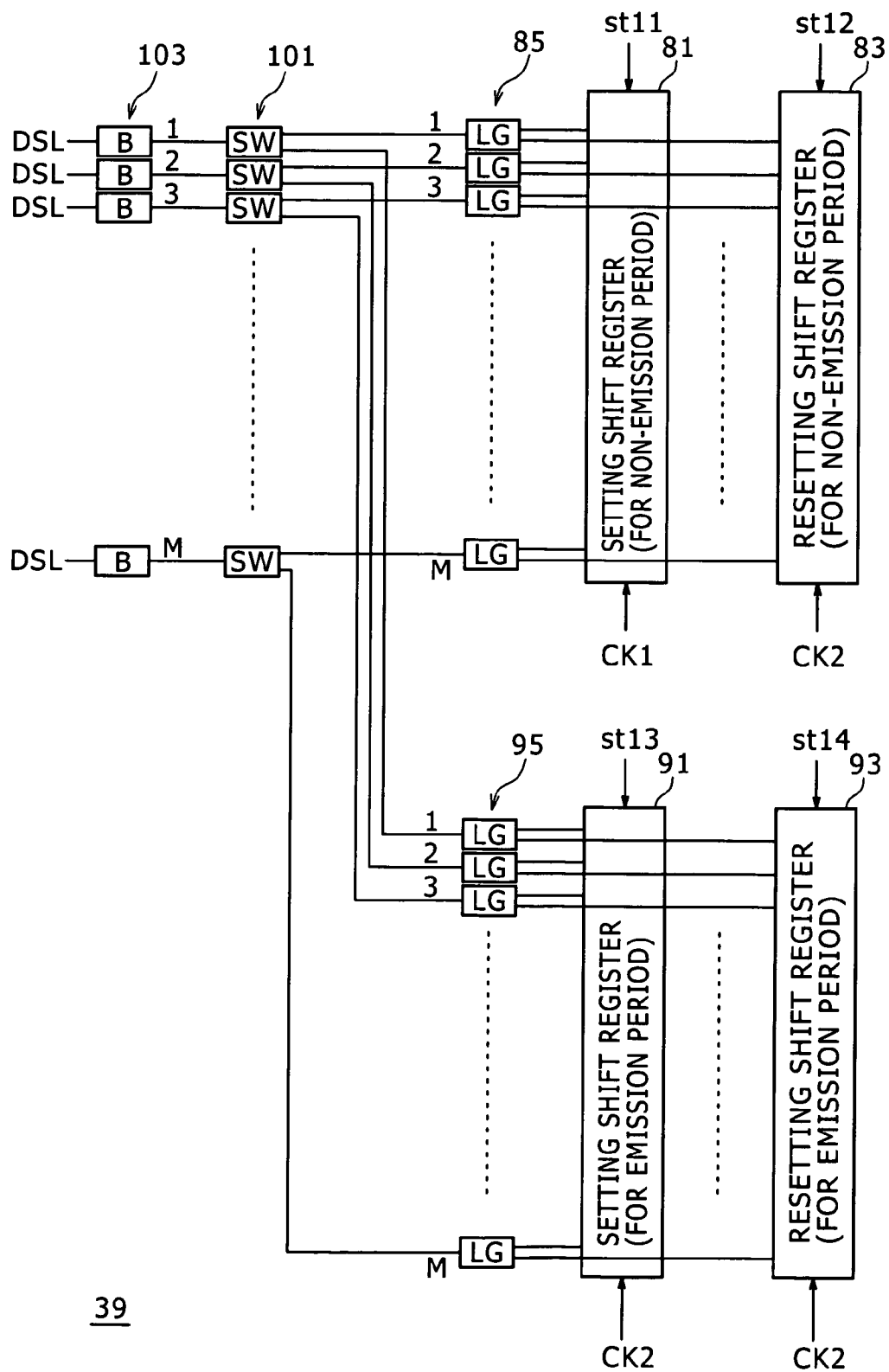
FIG. 13 is a diagram showing an example of circuit configuration of a power supply line driving section.

FIG. 13 shows an example of circuit configuration of the power supply control line driving section 39. The power supply control line driving section 39 includes a circuit stage for the non-emission period, a circuit stage for the emission period, a circuit stage for selectively outputting control pulses for these different periods, and a circuit stage for converting a control pulse at a logic level to a control pulse at a driving level.

Of the circuit parts, the circuit part for the non-emission period is formed by a setting shift register 81, a resetting shift register 83, and logic gates 85.

The setting shift register 81 is formed by M delay stages corresponding to the vertical resolution. The setting shift register 81 operates on the basis of the first shift clock CK1 synchronous with the horizontal scanning clock. Each time the first shift clock CK1 is input, the setting shift register 81 transfers a setting pulse to a next delay stage. Transfer start timing is given by a start pulse st11.

The resetting shift register 83 is also formed by M delay stages corresponding to the vertical resolution. Similarly, the resetting shift register 83 operates on the basis of the first shift clock CK1 synchronous with the horizontal scanning clock. Each time the first shift clock CK1 is input, the resetting shift register 83 transfers a resetting pulse to a next delay stage. Transfer start timing is given by a start pulse st12.

The logic gates 85 are a circuit device for generating a pulse signal having a pulse width from the input of the setting pulse to the input of the resetting pulse. The logic gates 85 are arranged by the number of power supply control lines DSL.

Incidentally, when an edge of the pulse signal is desired to be set in the middle of one horizontal scanning period, it suffices to obtain the waveform of a logical product of a pulse waveform giving the timing of the edge and the pulse signal generated by the setting pulse and the resetting pulse.

Similarly, the circuit part for the emission period is formed by a setting shift register 91, a resetting shift register 93, and logic gates 95.

The setting shift register 91 is formed by M delay stages corresponding to the vertical resolution. The setting shift register 91 operates on the basis of the second shift clock CK2 having a higher speed than the horizontal scanning clock. Each time the second shift clock CK2 is input, the setting shift register 91 transfers a setting pulse to a next delay stage. Transfer start timing is given by a start pulse st13.

The resetting shift register 93 is also formed by M delay stages corresponding to the vertical resolution. Similarly, the resetting shift register 93 operates on the basis of the second shift clock CK2 having a higher speed than the horizontal scanning clock. Each time the second shift clock CK2 is input, the resetting shift register 93 transfers a resetting pulse to a next delay stage. Transfer start timing is given by a start pulse st14.

The logic gates 95 are a circuit device for generating a pulse signal having a pulse width from the input of the setting pulse to the input of the resetting pulse. The logic gates 95 are arranged by the number of power supply control lines DSL.

Incidentally, when an edge of the pulse signal is desired to be set in the middle of one horizontal scanning period, it suffices to obtain the waveform of a logical product of a pulse waveform giving the timing of the edge and the pulse signal generated by the setting pulse and the resetting pulse.

The pulse signals from the circuit parts provided for these two process periods are selected by switch circuits 101. The switch circuits 101 select the pulse signals input from the logic gates 85 for the non-emission period, and select the pulse signals input from the logic gates 95 for the emission period. Incidentally, the selection of the pulse signals is changed by a changing signal not shown in the figure. Of course, the pulse signals of the logic gates 95 can also be used as the changing signal.

That is, a method of interlocking the changing of logic level of the logic gates 95 is adopted. Of course, when the pulse signals input from the logic gates 95 are changed to an H-level, the pulse signals are selected, and when the pulse signals are changed to an L-level, the pulse signals input from the logic gates 85 are selected.

Buffer circuits 103 are arranged in a stage succeeding the switch circuits 101. The buffer circuits 103 are a circuit device for level-converting a power supply control signal at a logic level to a power supply control signal at a driving level. The buffer circuits 103 need to have a capability of simultaneously driving N sub-pixels connected to a power supply control line DSL.

(e) Configuration of Timing Generator 41

The timing generator 41 is a circuit device for generating timing control signals and clocks necessary to drive the organic EL panel module 31. The timing generator 41 generates for example the clock signal CK, the first shift clock CK1, the second shift clock CK2, the start pulses st1, st2, st11, st12, st13, and st14 and the like.

(B-2) Driving Operation (a) Outline of Display Schedule

Description will be made below of the display schedule of the organic EL panel module 31 according to the present embodiment. In the present embodiment, a case where the organic EL panel module 31 is supplied with an image stream of 60 frames/second is assumed. That is, a case where both an image stream for a two-dimensional image and an image stream for a three-dimensional image are taken or generated at a rate of 60 frames/second is assumed.

FIGS. 14A and 14B show the display schedules of image streams assumed in the present embodiment. As shown in FIGS. 14A and 14B, the present embodiment adopts a driving system that makes display at a rate of 120 frames/second irrespective of difference in kind of an input image stream. That is, a driving system that displays two frames in 1/60 [seconds] is adopted.

FIG. 14A is the display schedule of a two-dimensional image. In the case of a two-dimensional image, frame images of same image contents are displayed in a first half period and a second half period of a display period given in a unit of 1/60 [seconds]. That is, frame images are displayed twice each in such a manner as F1→F1→F2→F2→F3→F3→F4→F4 . . . Of course, an image obtained by applying motion compensation to an input image may be inserted in the second half period of the display period. The insertion of an image obtained by motion compensation can enhance the display quality of the moving image. This display corresponds to a so-called double-speed display technique.

FIG. 14B is the display schedule of a three-dimensional image. In the case of a three-dimensional image, an image L for a left eye is displayed in a first half period of a display period given in a unit of 1/60 [seconds], and an image R for a right eye is displayed in a second half period of the display period. That is, images for the left eye and the right eye are displayed alternately in such a manner as L1→R1→L2→R2→L3 R3→L4→R4 . . .

(b) Outline of Driving Timing

FIGS. 15A, 15B, 15C, 15D, and 15E and FIGS. 16A, 16B, 16C, 16D, and 16E show relation between driving signal waveforms and potential changes of the driving transistor N2 with attention directed to a sub-pixel 51 on a certain horizontal line forming the pixel array section 33. Incidentally, FIGS. 15A to 15E correspond to the operation of a horizontal line located in a first row, and FIGS. 16A to 16E correspond to the operation of a horizontal line located in a last row. A difference between the two operations is a difference between the lengths of waiting times T1 and TM to a lighting period appearing after an end of a non-emission period, as later described.

FIG. 15A and FIG. 16A show the driving waveform of a writing control line WSL corresponding to the sub-pixel 51 of interest.

FIG. 15B and FIG. 16B show the driving waveform of a signal line DTL. FIG. 15C and FIG. 16C show the driving waveform of a corresponding power supply control line DSL. FIG. 15D and FIG. 16D show the waveform of the gate potential Vg of the driving transistor N2. FIG. 15E and FIG. 16E show the waveform of the source potential Vs of the driving transistor N2.

As shown in FIGS. 15A to 15E and FIGS. 16A to 16E, the driving operation of the organic EL panel module 31 can be divided into a driving operation in a non-emission period and a driving operation in an emission period.

An initializing operation, an operation of writing a signal potential Vsig to the sub-pixel 51, and an operation of correcting variations in characteristics of the driving transistor N2 (threshold value correcting operation and mobility correcting operation) are performed in the non-emission period.

An operation of lighting the organic EL element OLED on the basis of the signal potential Vsig written in the non-emission period and an operation of temporarily stopping the lighting (that is, an extinguishing operation) are performed in the emission period. In the present embodiment, timing in which the extinguishing operation is performed and a period length for which the extinguishing operation is performed are set so as to differ in each horizontal line. This is because there is a need to accommodate a difference between the scan speed of a pulse signal giving a lighting period and the scan speed of a control pulse giving non-emission period control timing.

FIGS. 17A, 17B, 17C, and 17D show relation between waiting times provided for this speed adjustment and horizontal lines. Incidentally, FIGS. 17A to 17D represent a case where the number of horizontal lines is "5" in order to clarify correspondences. Incidentally, FIG. 17A shows timing of input of an image L for the left eye and an image R for the right eye. FIG. 17B shows correspondences between input image data and the horizontal lines. The positions of broken lines correspond to horizontal lines 1 to 5.

FIG. 17C shows relation between waiting times T1 to T5 from a time of an end of the non-emission period to a start of lighting in each horizontal line. As is understood from the figure, the waiting time T1 of horizontal line 1 where the lighting period starts first from the time of an end of the non-emission period is the longest, and the waiting time T5 of horizontal line 5 where the lighting period starts last is a minimum (including zero). Incidentally, horizontal lines 2, 3, and 4 are assigned waiting times T2, T3, and T4 obtained by equally dividing a difference between T1 and T5.

Such waiting times T can be set freely because lighting start timing and lighting period length in the organic EL panel module can be set freely by the control of the power supply control line DSL.

FIG. 17D shows timing of display of the image L for the left eye and the image R for the right eye. As shown in the figure, the display periods of the image L for the left eye and the image R for the right eye do not overlap each other. In addition, there is even a free time between the display periods. Thus, when the opened state and closed state of liquid crystal shutters can be changed during the free time, only images necessary for the left eye and the right eye can be input.

Figures 18A, 18B, 18C, 18D:
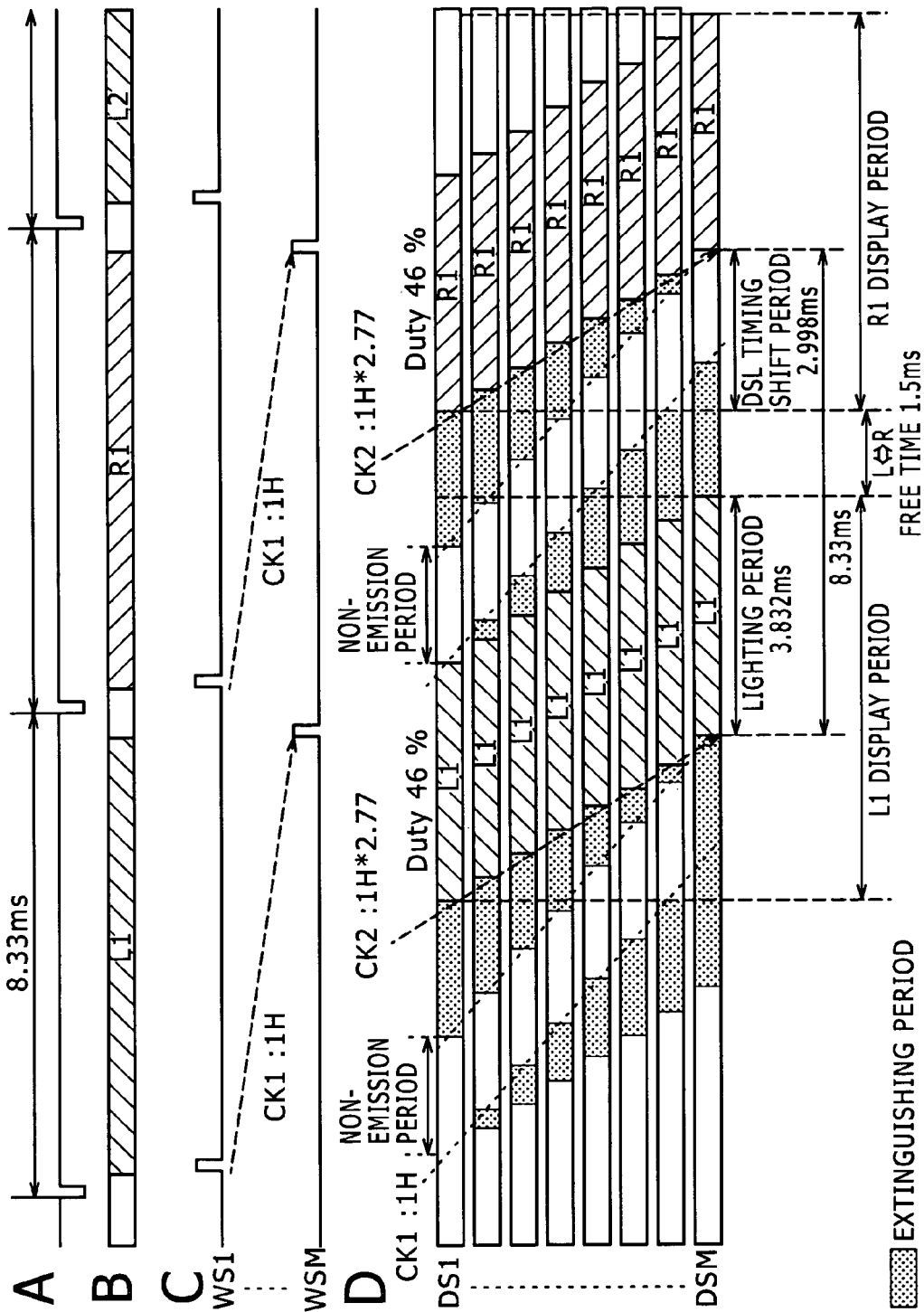
FIGS. 18A, 18B, 18C, and 18D are diagrams of assistance in explaining a relation between processing timing by horizontal line and display periods at a time of display of a three-dimensional image (embodiment)

FIGS. 18A, 18B, 18C, and 18D show the relation of the above-described driving timing by a concrete example of numerical values. FIG. 18A is a waveform chart of a vertical synchronizing pulse giving one frame period. In the present embodiment, the vertical synchronizing pulse is given so as to display 120 frames in one second. Thus, in the present embodiment, a period length (a frame length) from a vertical synchronizing pulse to a vertical synchronizing pulse is 8.33 ms.

FIG. 18B is a diagram showing an image stream. FIG. 18B shows an image L1 for the left eye and an image R1 for the right eye which images form a first frame and a part of an image L2 for the left eye which image forms a second frame. As shown in FIG. 18B, each frame image is input between a vertical synchronizing pulse and a vertical synchronizing pulse.

FIG. 18C is a diagram showing the scan operation of a control pulse for driving the writing control line WSL. As shown in FIG. 18C, the control pulse is shift-driven in a line-sequential manner on the basis of the first shift clock CK1. In the present embodiment, the horizontal scanning clock is used as the first shift clock CK1.

FIG. 18D is a diagram of assistance in explaining relation of arrangement of non-emission periods of each horizontal line and lighting periods and extinguishing periods in emission periods. In FIG. 18D, outline sections are non-emission periods. In FIG. 18D, filled-in sections are extinguishing periods. On the other hand, diagonally hatched sections are lighting periods. As shown in FIG. 18D, extinguishing periods are arranged before and after a lighting period. The length of the extinguishing period provided before the lighting period as one of the extinguishing periods is the waiting time T described above.

As shown in FIG. 18D, the waiting times T of the horizontal lines include the longest waiting time T1 of horizontal line 1 as the first row and the shortest waiting time TM of horizontal line M as the last row. Incidentally, the extinguishing periods provided after the lighting periods conversely include the shortest extinguishing period of horizontal line 1 as the first row and the longest extinguishing period of horizontal line M as the last row. The extinguishing periods are thus arranged before and after the lighting periods to make the length of the lighting periods of each horizontal line the same length, that is, to prevent a luminance difference between horizontal lines.

In the case of FIG. 18D, the scan speed of the lighting periods (that is, the second shift clock CK2) is 2.77 times that of the first shift clock CK1. This relation is also understood from a fact that the slope of a thick broken line arrow indicating the slope of the lighting periods is steeper than the slope of a boundary line of the non-emission periods shown by outlines. This relation exerts an effect of compressing the display period of a frame image (period from a start of lighting in the first row to an end of lighting in the last row). In the present embodiment, the length of a lighting period of each horizontal line is 46% of one frame period, and is 3.832 ms.

In addition, a free time of 1.5 ms is secured between the display period of the image L1 for the left eye and the image R1 for the right eye. Incidentally, it suffices to secure only an amount of time necessary to control the opening and closing of the liquid crystal shutters as the free time. Thus, the length of the lighting periods and the scan speed (second shift clock CK2) can be adjusted freely so long as a minimum necessary free time is secured.

(c) Details of Driving Operation

Detailed description will be made below of driving states within the sub-pixel. Incidentally, the driving timing and changes in potential states of the driving transistor N2 will be described with reference to FIGS. 15A to 15E and FIGS. 16A to 16E described above.

(c-1) Lighting Operation Within Emission Period

Figure 19:
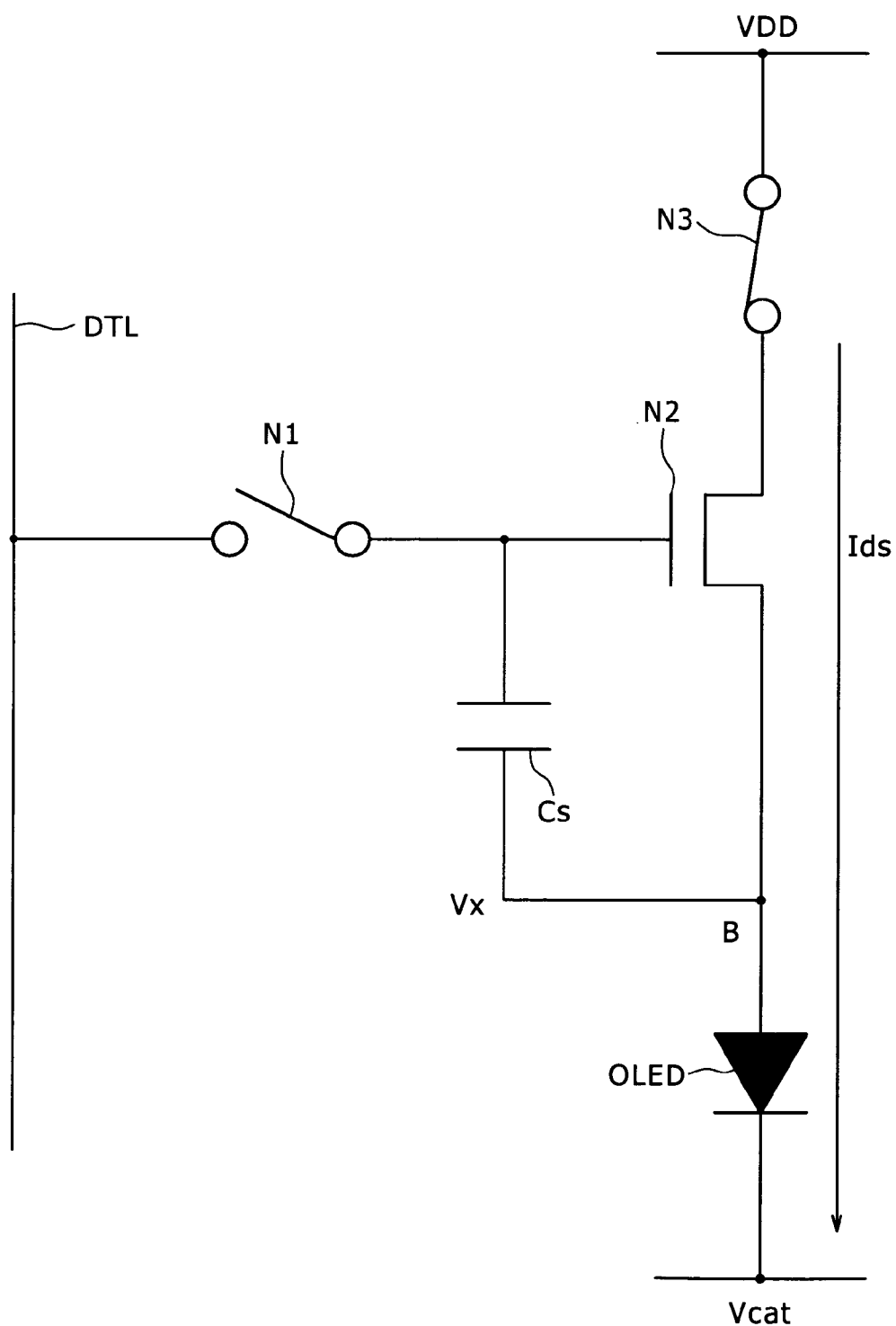
FIG. 19 is a diagram showing an equivalent circuit of a sub-pixel corresponding to a time of lighting operation.

FIG. 19 shows a state of operation within the sub-pixel in an emission period. At this time, the writing control line WSL is at an L-level, and the sampling transistor N1 is controlled to be in an off state. Thus, the gate electrode of the driving transistor N2 is controlled to be in a floating state.

On the other hand, the power supply control line DSL is at an H-level, and the power supply controlling transistor N3 is controlled to be in an on state. The driving transistor N2 is thereby controlled to be in a state of operating in a saturation region. That is, the driving transistor N2 operates as a constant-current source that supplies a driving current corresponding to a voltage retained by the storage capacitor Cs to the organic EL element OLED. Thus, the organic EL element OLED emits light at a luminance corresponding to a pixel gradation. This operation is performed for all sub-pixels 51 in the emission period.

(c-2) Extinguishing Operation Within Non-Emission Period

After the emission period ends, a non-emission period begins. An operation of extinguishing the organic EL element OLED is performed first in the non-emission period.

Figure 20:
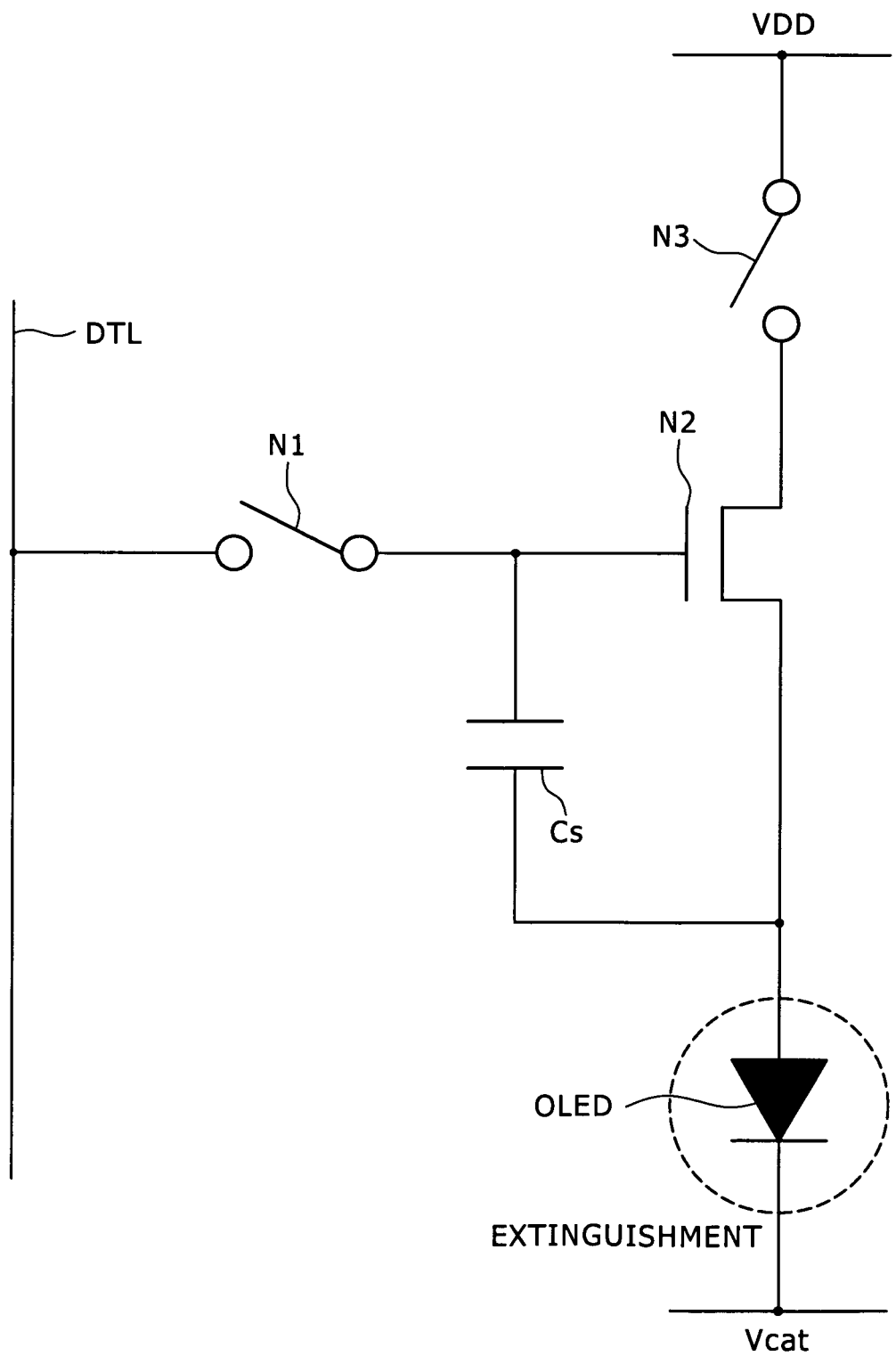
FIG. 20 is a diagram showing the equivalent circuit of the sub-pixel corresponding to a time of extinguishing operation during a non-emission period.

FIG. 20 shows a state of operation within the sub-pixel at a time of extinguishing operation. In the extinguishing operation, the power supply control line DSL is changed to an L-level, and the power supply controlling transistor N3 is controlled to be off. Incidentally, the off state of the sampling transistor N1 is still maintained.

This operation stops the supply of the driving current to the organic EL element OLED. With this, the organic EL element OLED as a current-driven element is extinguished. A voltage across the organic EL element OLED is simultaneously lowered to a threshold voltage Vth(oled). The source potential Vs of the driving transistor N2 is lowered to a potential obtained by adding the threshold voltage Vth(oled) to a cathode potential Vcat. In addition, with the decrease in the source potential, the gate potential Vg of the driving transistor N2 is also lowered. Incidentally, the storage capacitor Cs at this point in time still retains the gradation information of a previous frame.

(c-3) Initializing Operation Within Non-Emission Period

An initializing operation for initializing the gradation information of the previous frame is performed next.

Figure 21:
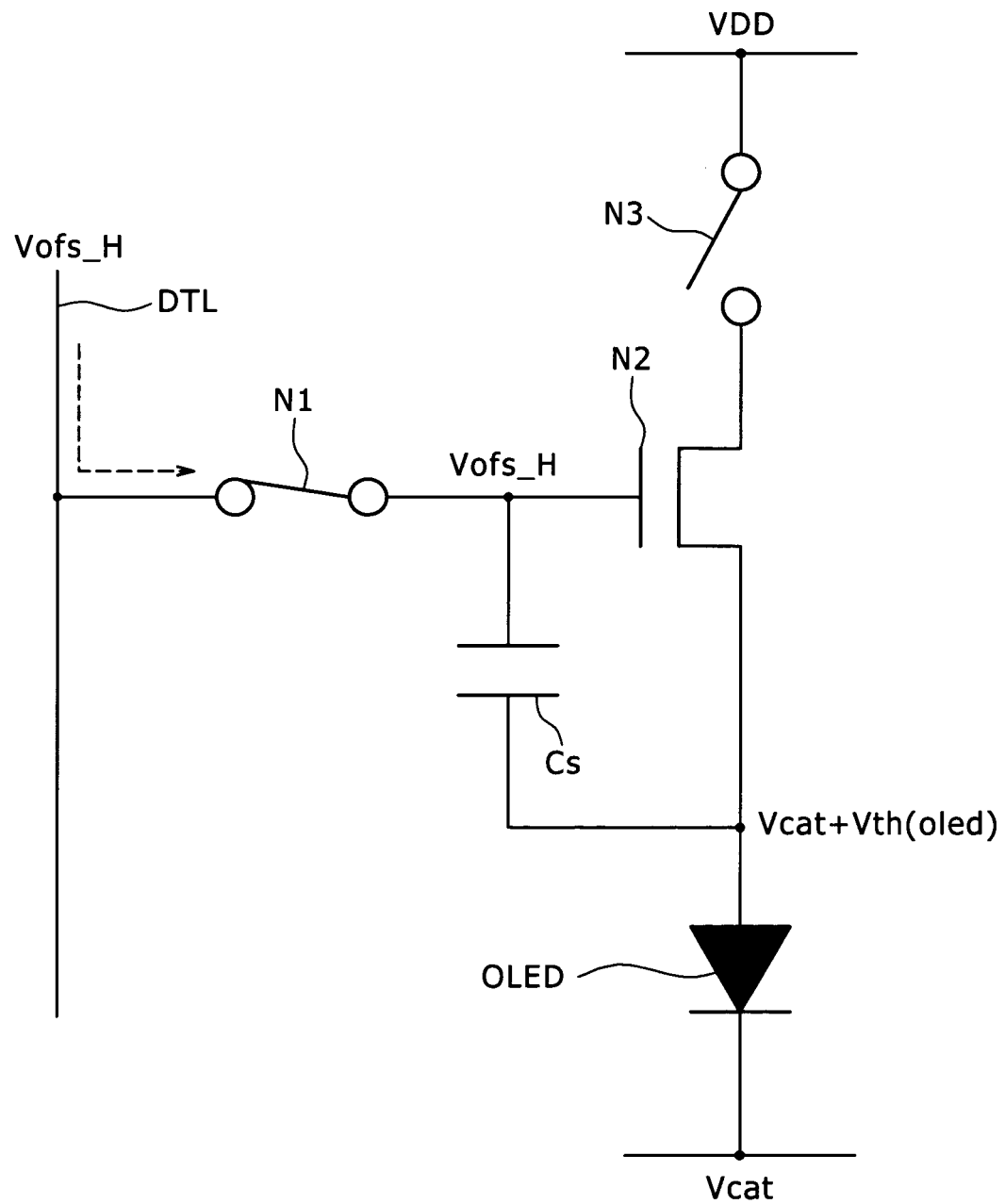
FIG. 21 is a diagram showing the equivalent circuit of the sub-pixel corresponding to a time of initializing operation during the non-emission period.

FIG. 21 shows a state of operation within the sub-pixel at a time of the initializing operation. When initializing timing arrives, the writing control line WSL is controlled to an H-level, and the sampling transistor N1 is changed to an on state. In addition, the initializing potential Vofs_H is applied to the signal line DTL in synchronism with the on operation of the sampling transistor N1. The initializing potential Vofs_H is thereby written to the gate potential Vg of the driving transistor N2 (FIG. 15D and FIG. 16D).

With a rise in the gate potential Vg, the source potential Vs of the driving transistor N2 also rises (FIG. 15E and FIG. 16E). That is, the source potential Vs becomes higher than the potential obtained by adding the threshold voltage Vth(oled) to the cathode potential Vcat. The organic EL element OLED is thereby set in an on state. However, because the power supply controlling transistor N3 remains in an off state, the organic EL element OLED operates in such a manner as to extract a charge from the source electrode of the driving transistor N2. The source potential Vs of the driving transistor N2 soon changes to Vcat+Vth(oled) again.

As a result, a voltage given by a difference between "Vofs_H" and "Vcat+Vth(oled)" (that is, an initializing voltage) is written to the storage capacitor Cs. This operation is the initializing operation.

Incidentally, as described above, the organic EL element OLED is set in a state of being able to emit light momentarily in the process of the initializing operation. However, image quality is not affected because even if the organic EL element OLED emits light, the luminance is low and the emission period is very short.

Figure 22:
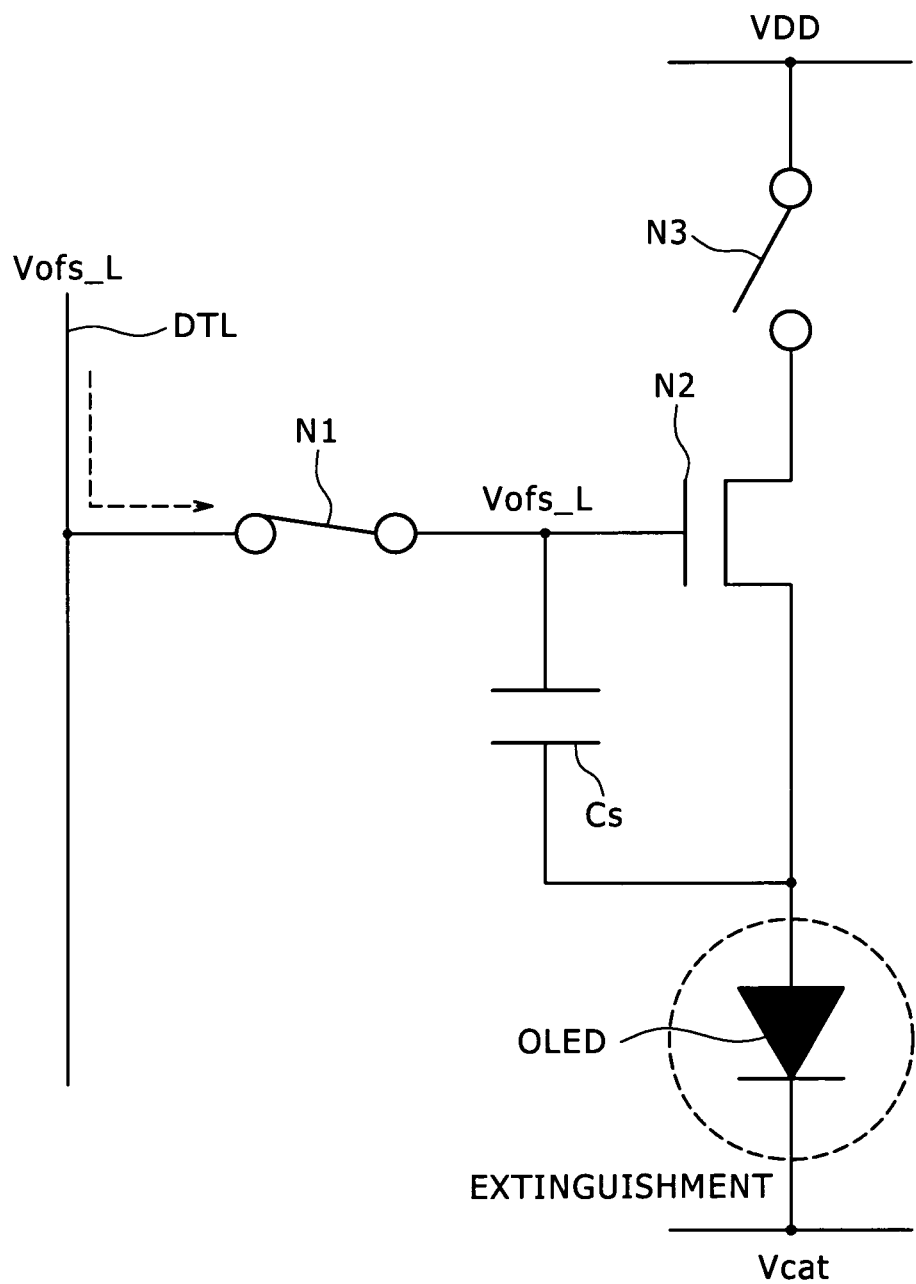
FIG. 22 is a diagram showing the equivalent circuit of the sub-pixel corresponding to the time of initializing operation during the non-emission period.

After the initializing voltage is written to the storage capacitor Cs, the potential of the signal line DTL changes from the initializing potential Vofs_H to the threshold value correcting potential Vofs_L. FIG. 22 shows a state of operation within the sub-pixel at this time. At this time, the sampling transistor N1 remains controlled to be on. The gate potential Vg of the driving transistor N2 is thereby lowered from the initializing potential Vofs_H to the threshold value correcting potential Vofs_L (FIG. 15D and FIG. 16D).

The source potential Vs of the driving transistor N2 is also lowered in such a manner as to be interlocked with the potential change of the gate potential Vg (FIG. 15E and FIG. 16E).

This is because the initializing voltage is retained in the storage capacitor Cs. However, at the time of the lowering, the voltage retained by the storage capacitor Cs is slightly compressed from the initializing voltage. Incidentally, the voltage retained by the storage capacitor Cs at the time of an end of the initialization is sufficiently larger than the threshold voltage Vth of the driving transistor N2. As a result of the above operation, a preparation for correcting variation in threshold voltage Vth of the driving transistor N2 is completed.

(c-4) Threshold Value Correcting Operation Within Non-Emission Period

Figure 23:
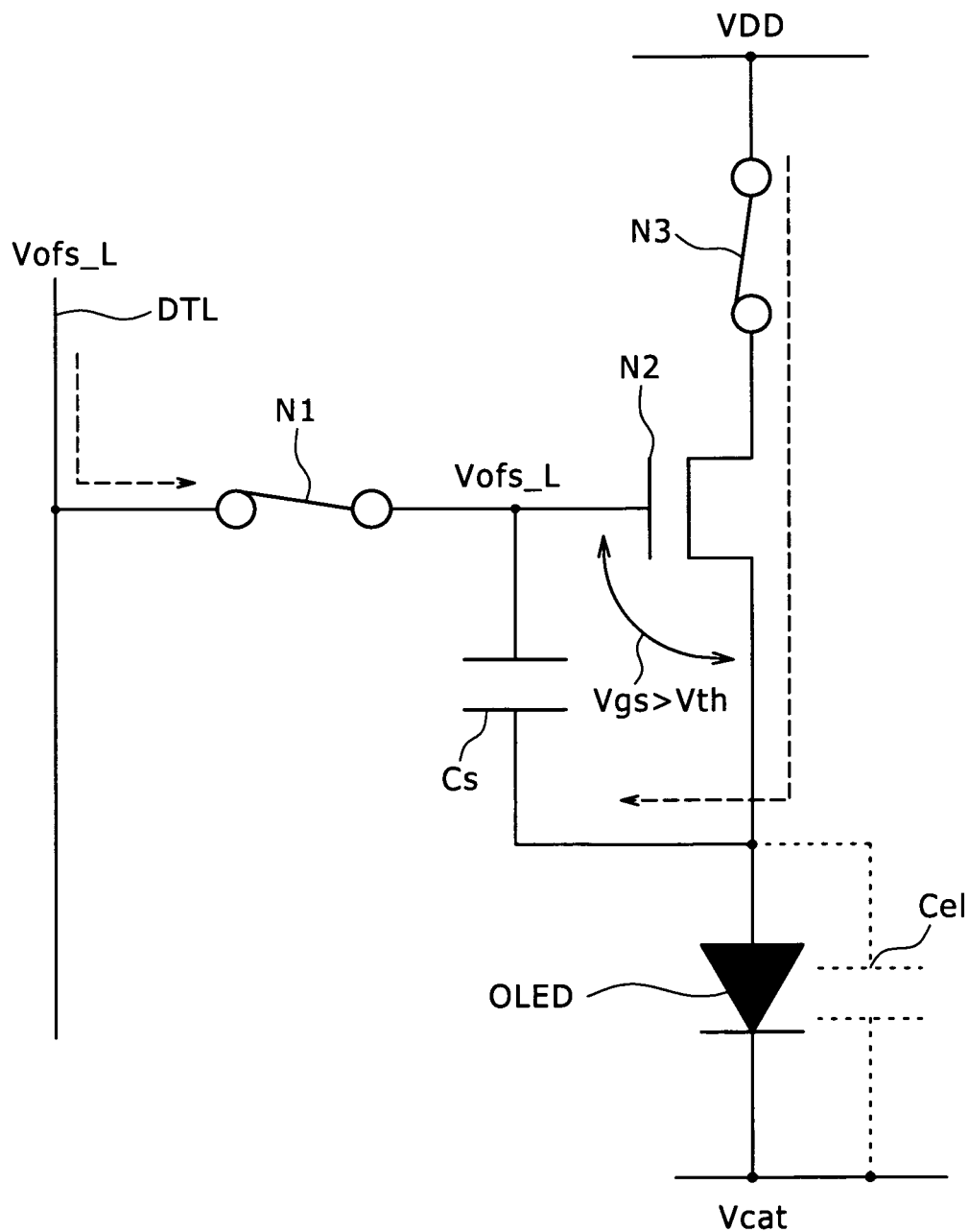
FIG. 23 is a diagram showing the equivalent circuit of the sub-pixel corresponding to a time of threshold value correcting operation during the non-emission period.

A threshold value correcting operation is started next. FIG. 23 shows a state of operation within the sub-pixel at the time of the threshold value correcting operation. The threshold value correcting operation is started by controlling the power supply control line DSL at an H-level, and performing the on control of the power supply controlling transistor N3.

At the time of the start, the gate-to-source voltage Vgs of the driving transistor N2 is wider than the threshold voltage Vth in consideration of variations. Thus, with the on control of the power supply controlling transistor N3, the driving transistor N2 is also changed to an on state.

With this, a current starts flowing through the driving transistor N2 so as to charge the storage capacitor Cs and a capacitive component parasitic on the organic EL element OLED.

With this charging operation, the source potential Vs of the driving transistor N2 rises gradually. Incidentally, the gate potential Vg of the driving transistor N2 is fixed at the threshold value correcting potential Vofs_L. Thus, during the on control of the power supply controlling transistor N3, the gate-to-source voltage Vgs of the driving transistor N2 is gradually reduced from the initializing voltage (FIGS. 15D and 15E and FIGS. 16D and 16E).

Figure 24:
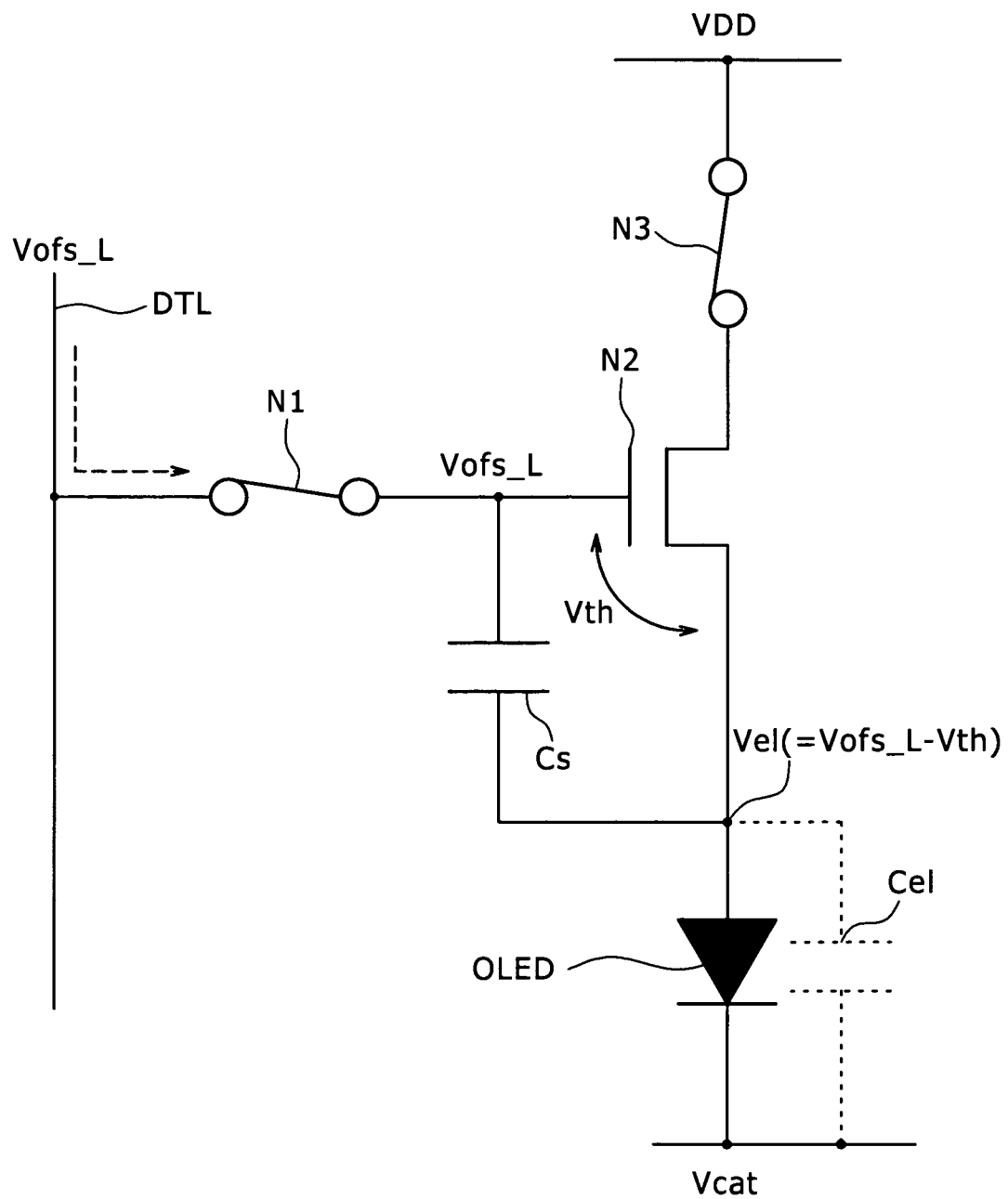
FIG. 24 is a diagram showing the equivalent circuit of the sub-pixel corresponding to a point in time of completion of the threshold value correcting operation.

The driving transistor N2 soon performs a cutoff operation automatically when the gate-to-source voltage Vgs of the driving transistor N2 reaches the threshold voltage Vth. FIG. 24 shows a state of operation within the sub-pixel when the driving transistor N2 cuts off automatically. At this time, the writing of the threshold value correcting potential Vofs_L to the gate electrode of the driving transistor N2 is continued. The source potential Vs of the driving transistor N2 is given by Vofs_L–Vth. The threshold value correcting operation is thereby completed.

Incidentally, "Vofs-L–Vth" is set to be a potential lower than "Vcat+Vth(oled)." Therefore the organic EL element OLED maintains the extinguished state also at this time.

Figure 25:
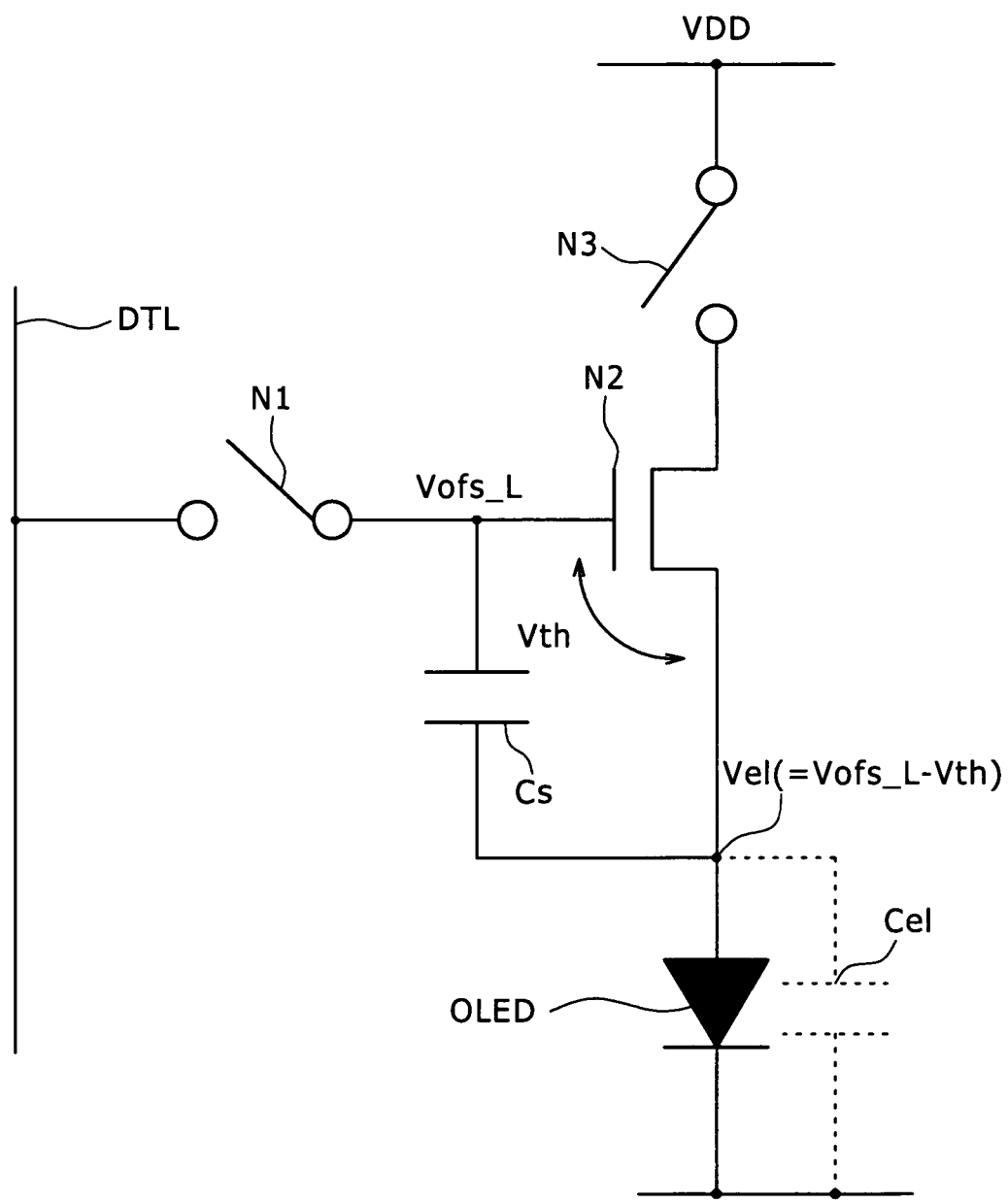
FIG. 25 is a diagram showing the equivalent circuit of the sub-pixel corresponding to operation from the completion of the threshold value correcting operation to a start of writing of a signal potential.

When the threshold value correcting operation is completed, as shown in FIG. 25, the sampling transistor N1 and the power supply controlling transistor N3 are simultaneously controlled to be off. At this time, the driving transistor N2 and the organic EL element OLED are both in an off state.

Ignoring the effect of an off current, the gate potential Vg and the source potential Vs of the driving transistor N2 continue maintaining a potential state at the time of completion of the threshold value correcting operation.

(c-5) Signal Potential Writing Operation Within Non-Emission Period

Figure 26:
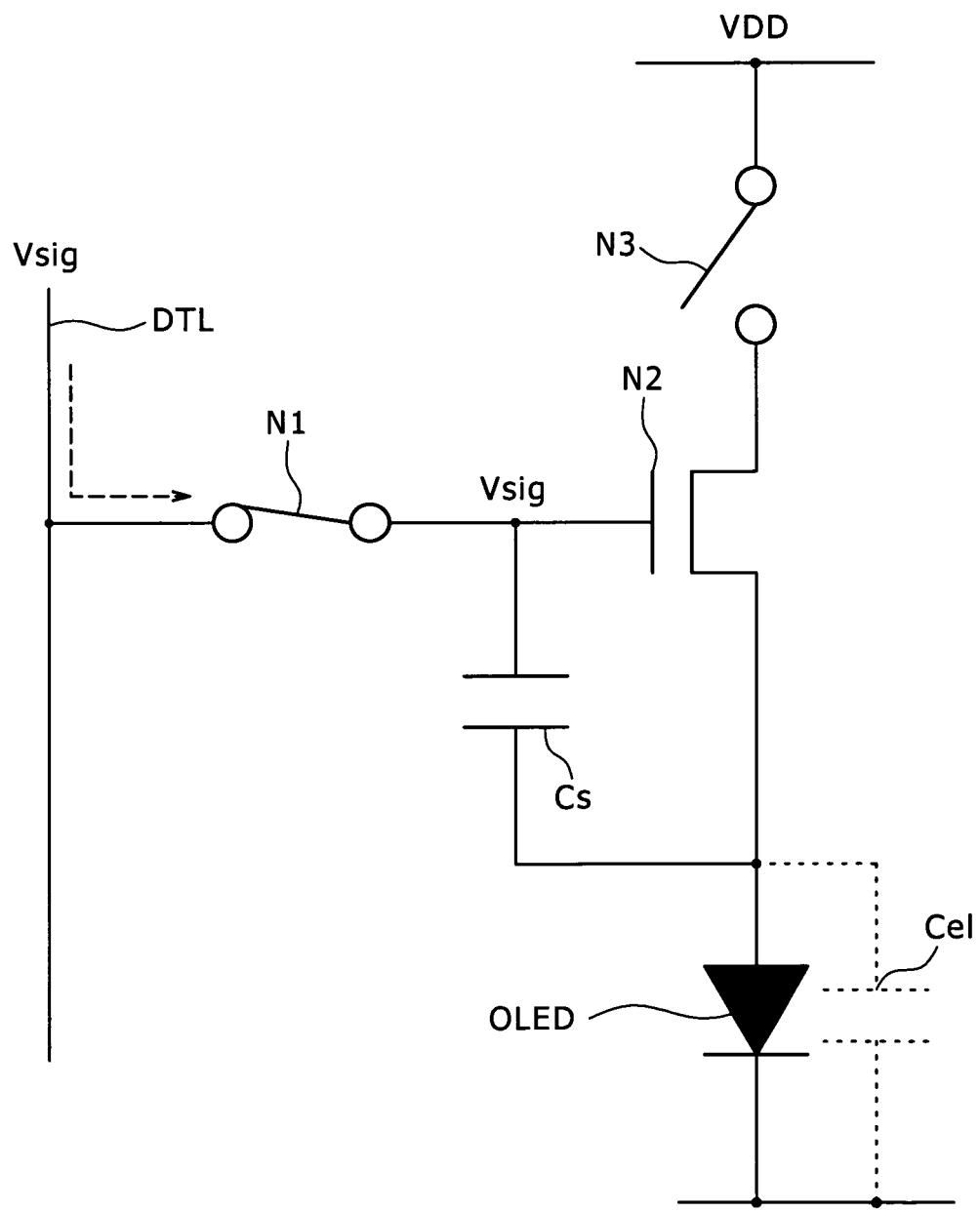
FIG. 26 is a diagram showing the equivalent circuit of the sub-pixel corresponding to a time of the operation of writing the signal potential.

An operation of writing a signal potential Vsig is started next. FIG. 26 shows a state of operation within the sub-pixel when the operation of writing the signal potential Vsig is performed. In the present embodiment, this operation is started by performing on control of the sampling transistor N1 with the power supply controlling transistor N3 controlled to be off.

Incidentally, the potential of the signal line DTL is changed to the signal potential Vsig before the sampling transistor N1 is changed to an on state (FIGS. 15A to 15C and FIGS. 16A to 16C).

With the start of this operation, the gate potential Vg of the driving transistor N2 rises to the signal potential Vsig (FIG. 15D and FIG. 16D). That is, the signal potential Vsig is written to the storage capacitor Cs. However, with the rise in the gate potential Vg, the source potential Vs of the driving transistor N2 also rises slightly (FIG. 15E and FIG. 16E).

When the signal potential Vsig is thus written, the gate-to-source voltage Vgs of the driving transistor N2 becomes larger than the threshold voltage Vth, and the driving transistor N2 changes to an on state. However, the driving transistor N2 does not pass a driving current because the power supply controlling transistor N3 is in an off state. Thus, the extinguished state of the organic EL element OLED is maintained.

(c-6) Mobility Correcting Operation Within Non-Emission Period

Figure 27:
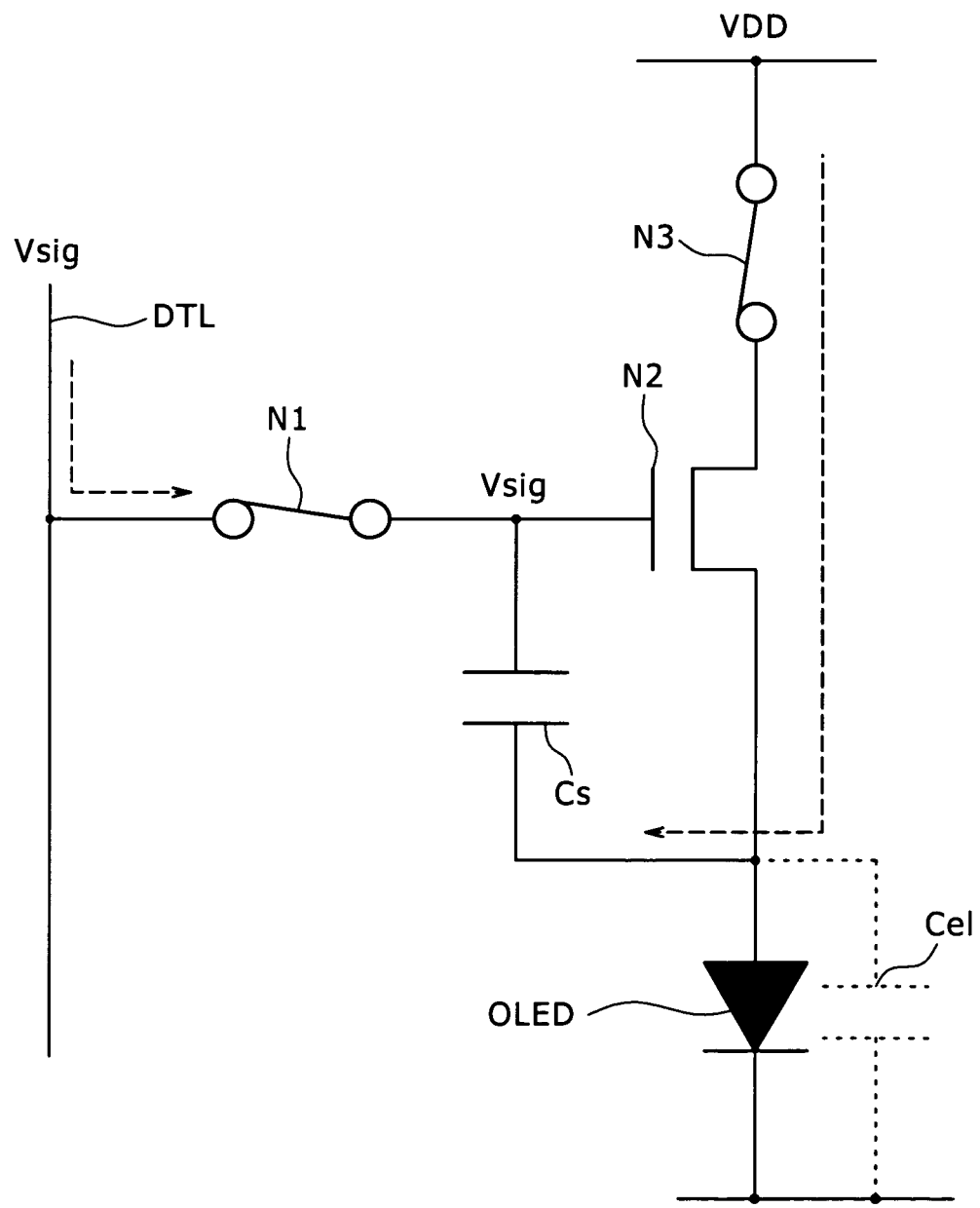
FIG. 27 is a diagram showing the equivalent circuit of the sub-pixel corresponding to a time of mobility correcting operation.

After the writing of the signal potential Vsig is completed, an operation of correcting variation in mobility μ of the driving transistor N2 is started. FIG. 27 shows a state of operation within the sub-pixel at the time of this operation. This operation is started by performing on control of the power supply controlling transistor N3.

With the on control of the power supply controlling transistor N3, a driving current of a magnitude corresponding to the gate-to-source voltage Vgs starts flowing through the driving transistor N2. This driving current flows so as to charge the storage capacitor Cs and the parasitic capacitance of the organic EL element OLED. That is, the source potential Vs of the driving transistor N2 rises. Incidentally, the extinguished state of the organic EL element OLED is maintained until the source potential Vs exceeds the threshold voltage Vth(oled) of the organic EL element OLED.

The higher the mobility μ of the driving transistor N2, the larger the driving current flowing in the mobility correcting period, and the lower the mobility μ of the driving transistor N2, the smaller the driving current, even at the same gate-to-source voltage Vgs. Consequently, the higher the mobility μ of the driving transistor N2, the smaller the gate-to-source voltage Vgs.

As a result of this correcting operation, the driving transistor N2 given a same pixel gradation supplies the driving current of a same magnitude to the organic EL element OLED irrespective of difference in mobility μ. That is, when the pixel gradation is the same, the light emission luminance of the sub-pixel 51 is corrected to be the same irrespective of difference in mobility μ.

In FIG. 15A and FIG. 16A, the waveform of a control pulse of the writing control line WSL used at the time of correcting the mobility μ is changed nonlinearly. This is to prevent an excess or a shortage of an amount of correction due to difference in magnitude of the pixel gradation.

When the on state of the power supply controlling transistor N3 is continued after completion of the mobility correcting operation, the source potential Vs of the driving transistor N2 rises to exceed the threshold voltage Vth(oled) of the organic EL element OLED, and the lighting of the organic EL element OLED is started.

However, in the present embodiment, the scan speed of a control pulse giving the lighting period is set higher than the scan speed of a control pulse giving the driving timing of the non-emission period. Hence, the point in time of a start of lighting needs to be delayed by the waiting time T determined for each horizontal line.

Accordingly, in the present embodiment, the power supply controlling transistor N3 is controlled to be off until the waiting time T for the corresponding horizontal line passes (FIG. 15C and FIG. 16C).

Incidentally, FIGS. 16A to 16E show the driving waveforms of the horizontal line corresponding to the last row (Mth row), and because the waiting time TM is, set to zero, the lighting period starts from a mobility corrected state immediately.

(c-7) Waiting Time Operation Within Emission Period

After all the operations in the non-emission period are completed as described above, the operation of the emission period begins. As described above, all processes necessary to light the organic EL element OLED are completed when the non-emission period ends. However, as described above, the clock speed of the second shift clock CK2 used in the emission period is faster than that of the first shift clock CK1 used in the non-emission period.

Thus, the waiting time T before the organic EL element OLED is lit needs to be lengthened as the horizontal line becomes closer to the first row, as shown in FIG. 18D.

Figure 28:
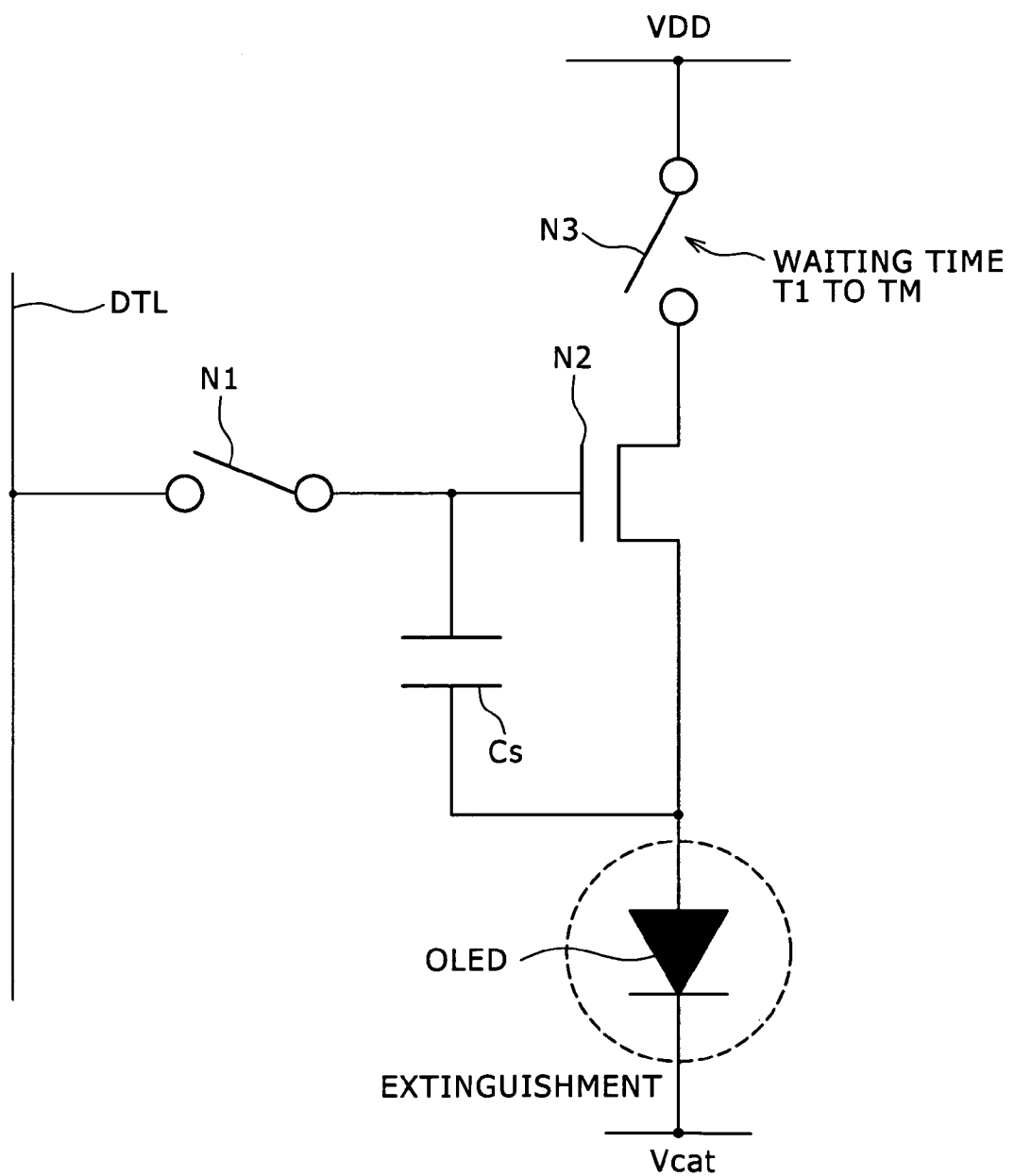
FIG. 28 is a diagram showing the equivalent circuit of the sub-pixel corresponding to a waiting time to a start of lighting.

FIG. 28 shows a state of operation within the sub-pixel during the waiting time T. As shown in FIG. 28, the power supply controlling transistor N3 is controlled to be in an off state during the waiting time T determined for each horizontal line. Of course, the display of the horizontal line is black display during the waiting time.

(c-8) Lighting Operation Within Emission Period

Figure 29:
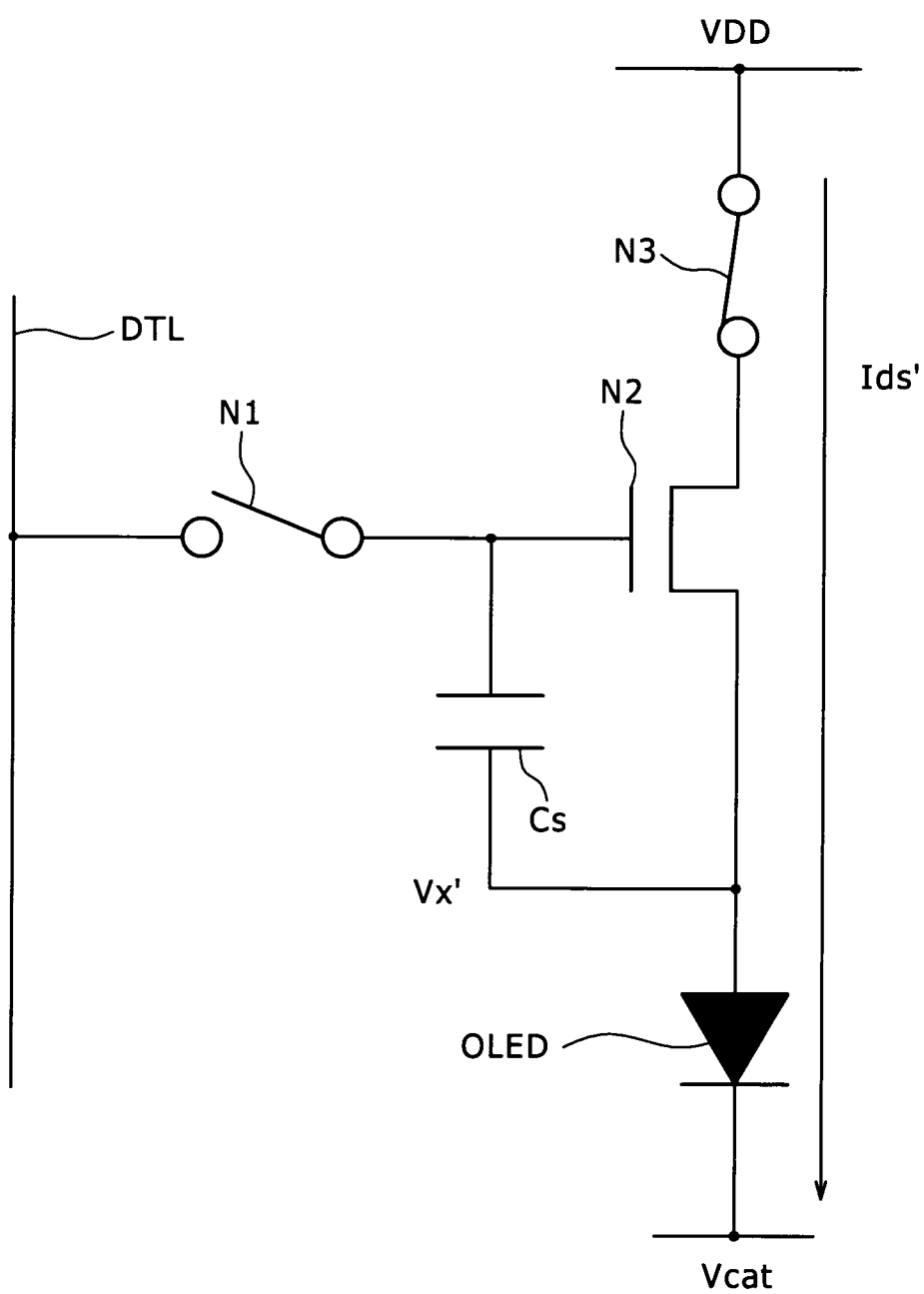
FIG. 29 is a diagram showing the equivalent circuit of the sub-pixel corresponding to a time after the start of the lighting.

When the waiting time T set for each horizontal line has passed, as shown in FIG. 29, the power supply controlling transistor N3 is changed to an on state, and an operation of lighting the organic EL element OLED is started.

(B-3) Summary

As described above, when the driving system according to the present embodiment is adopted, driving frequency necessary to display a three-dimensional image can be decreased to half that of the existing technique. Specifically, a three-dimensional image taken or generated at a rate of 60 frames/second can be displayed on a screen at a rate of 120 frames/second.

Thus lowering the driving frequency can increase an operation margin of the pixel array section 33. Therefore manufacturing cost of the pixel array section 33 can be decreased. In addition, because the driving frequency is lowered, the operating speed of the timing generator and the driving circuit (shift register, for example) can also be lowered. From these viewpoints, manufacturing cost of the organic EL panel module can be reduced.

In addition, in the present embodiment, it is not necessary to provide a driving circuit for two-dimensional images and a driving circuit for three-dimensional images separately from each other. That is, a driving method according to the embodiment eliminates a need to distinguish a two-dimensional image and a three-dimensional image from each other, and can display these images in single driving timing. Thus, the layout area of the driving circuit can be made smaller than in the existing example. In addition, the present embodiment does not need a circuit for determining kinds of images. Also from these viewpoints, a contribution can be made to reduction in cost of the organic EL panel module.

In addition, the present embodiment eliminates a need to write an entirely black screen for each frame. Thus, the length of the lighting period in the embodiment can be set correspondingly longer than in the existing example. That is, by adopting the driving technique according to the embodiment, the brightness of the screen does not have to be sacrificed even at a time of display of a three-dimensional image.

(C) Other Embodiments (C-1) Other Examples of Setting of Shift Clocks

In the foregoing embodiment, description has been made of a case where the clock speed of the second shift clock CK2 is set at 2.77 times the clock speed of the first shift clock CK1.

However, the clock speed ratio between the first shift clock CK1 and the second shift clock CK2 is not limited to this, of course.

(C-2) Ratio of Lighting Period to One Frame

In the foregoing embodiment, description has been made of a case where the ratio of the lighting period is 46% of one frame.

However, the lighting period may have other ratios. Of course, the higher the ratio of the lighting period, the higher the luminance of the screen even at a same driving voltage VDD.

(C-3) Waiting Time

In the foregoing embodiment, description has been made of a case where the waiting time TM of the horizontal line where the operation of writing the signal potential Vsig is completed last is set at zero.

However, the waiting time TM does not necessarily need to be set at zero.

(C-4) Other Structures of Sub-Pixel

In the foregoing embodiment, description has been made of a case where the sub-pixel 51 is formed with three N-channel thin film transistors.

However, the thin film transistors forming the sub-pixel 51 may be P-channel thin film transistors.

Figure 30:
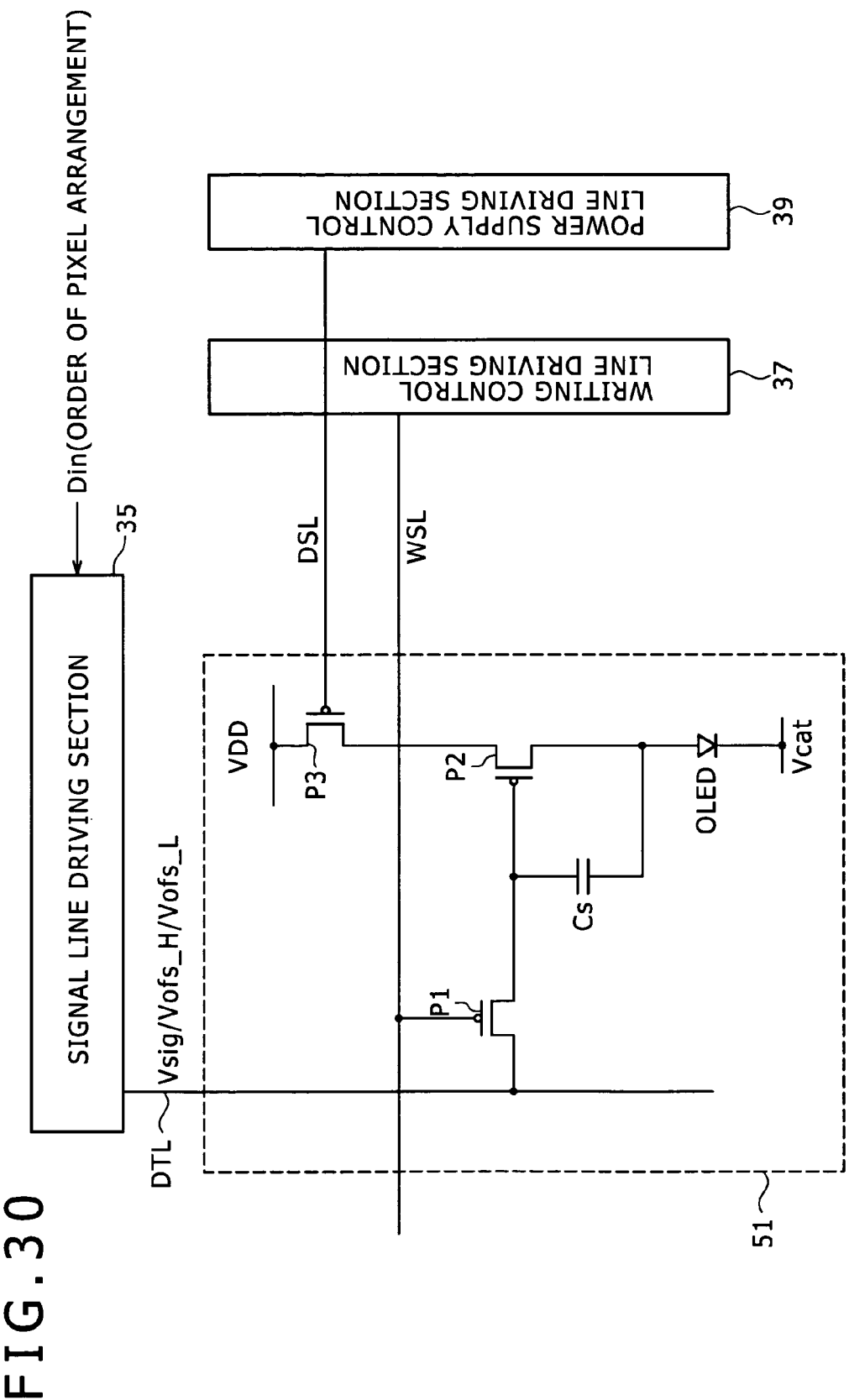
FIG. 30 is a diagram of assistance in explaining another example of circuit configuration of the sub-pixel.
Figure 31:
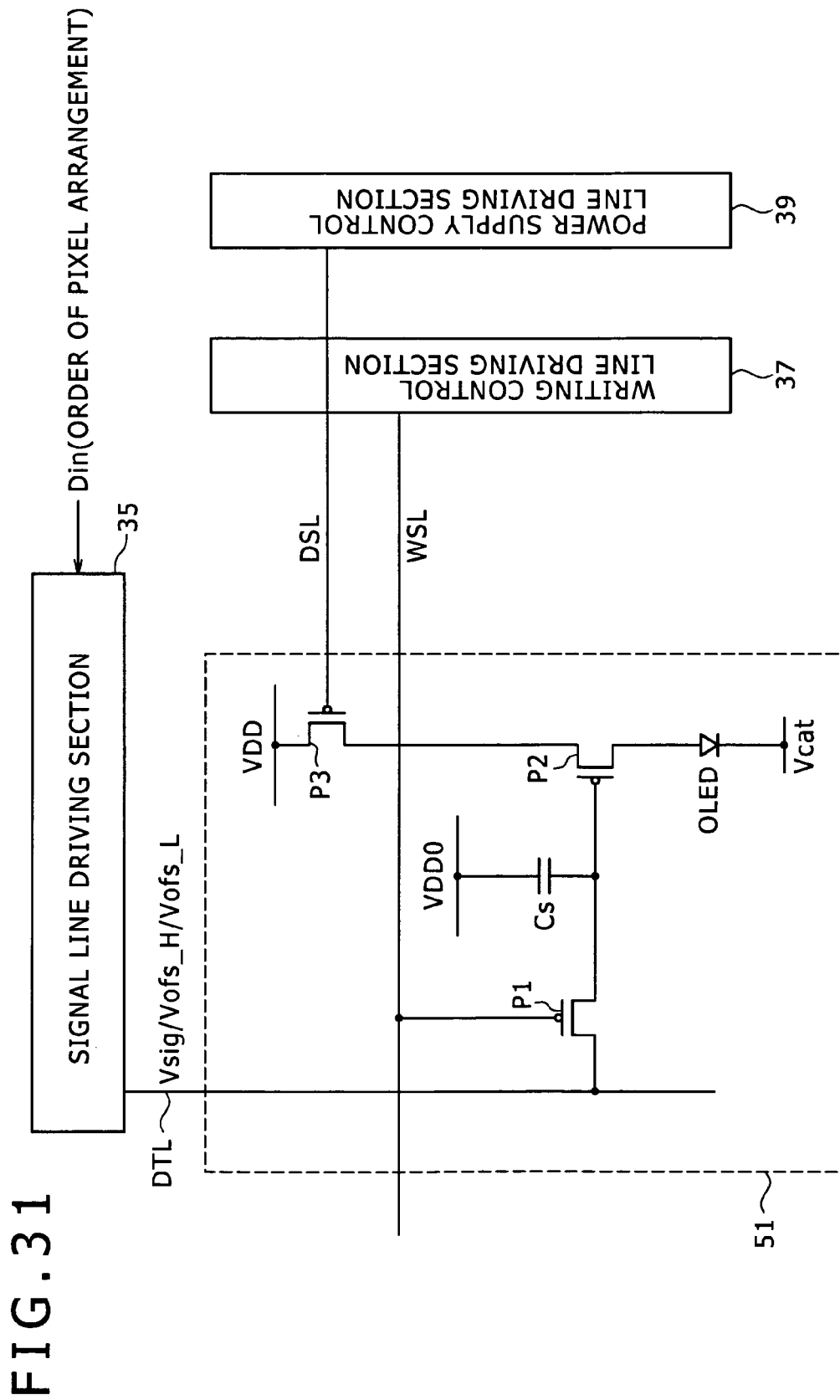
FIG. 31 is a diagram of assistance in explaining another example of circuit configuration of the sub-pixel.

FIG. 30 and FIG. 31 show an example of a circuit of this kind. FIG. 30 represents an example in which only the thin film transistors are all replaced with P-channel thin film transistors with the relation of connection of the sub-pixel 51 according to the embodiment retained as it is. On the other hand, FIG. 31 represents an example of a circuit in which the connection of the storage capacitor Cs is changed. In the case of FIG. 31, one electrode of the storage capacitor Cs is connected to a fixed power supply line (VDD0).

In addition, the number of thin film transistors forming the sub-pixel 51 may be four or more, or two. The driving technique according to an-embodiment of the present invention can be applied regardless of the circuit configuration of the sub-pixel 51 as long as the supply and the stopping of the supply of driving power can be controlled in horizontal line units.

(C-5) Switching Timing Notifying Device

In the foregoing embodiment, description has been made of a case where the switching timing of liquid crystal shutters is notified to the eyeglasses 9 provided with the liquid crystal shutters by infrared communication.

However, radio communication techniques usable now or in the future can be applied to the notification of the switching timing.

(C-6) Product Examples (a) System Configuration

The above description has been made of the panel structure and the driving method of the organic EL panel module alone. However, the above-described organic EL panel module is distributed also in product forms in which the organic EL panel module is mounted in various electronic devices. Examples of mounting the organic EL panel module in other electronic devices will be shown in the following.

Figure 32:
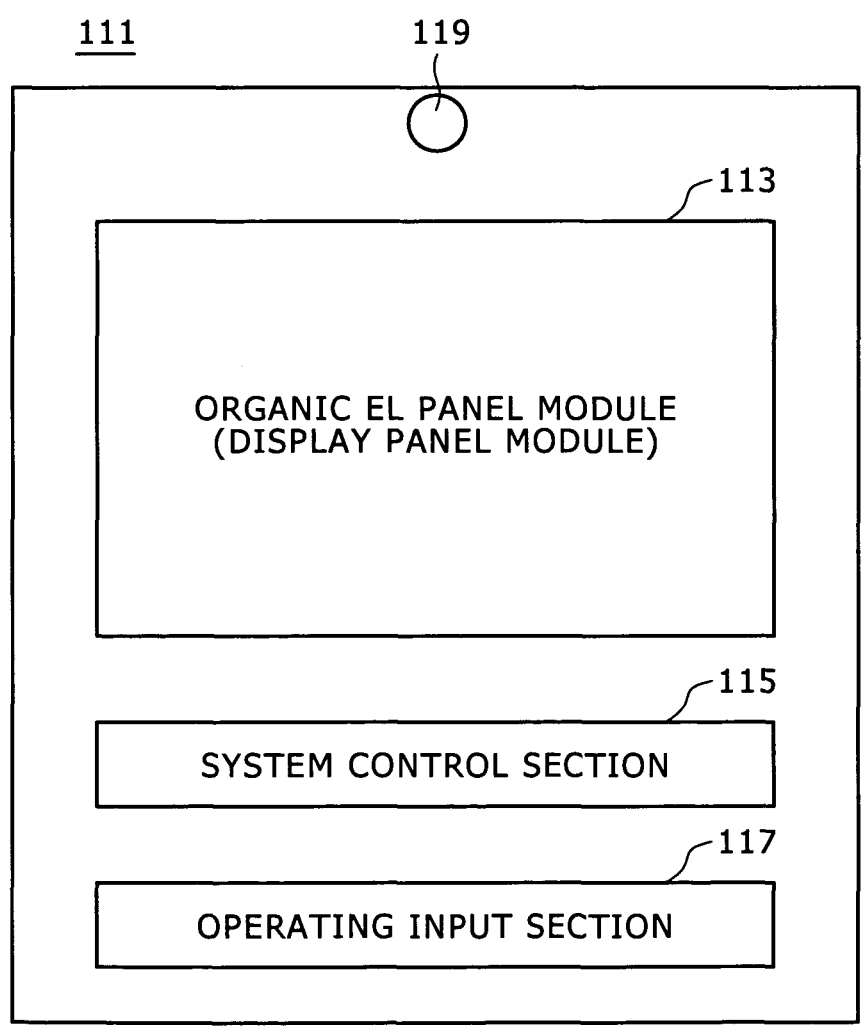
FIG. 32 is a diagram showing an example of conceptual configuration of an electronic device.

FIG. 32 shows an example of conceptual configuration of an electronic device 111. The electronic device 111 includes a display panel module 113 having the above-described driving circuit incorporated therein, a system control section 115, an operating input section 117, and a switching timing notifying device 119.

Details of processing performed in the system control section 115 differ depending on the product form of the electronic device 111. The operating input section 117 is a device for receiving an operating input to the system control section 115. For example a switch, a button, or another mechanical interface, a graphics interface or the like is used as the operating input section 117.

In addition, the switching timing notifying device 119 not only is attached integrally with the casing of the electronic device 111 as shown in FIG. 32, but also may be external to the casing of the electronic device 111 as an independent device.

(b) Concrete Examples

Figure 33:
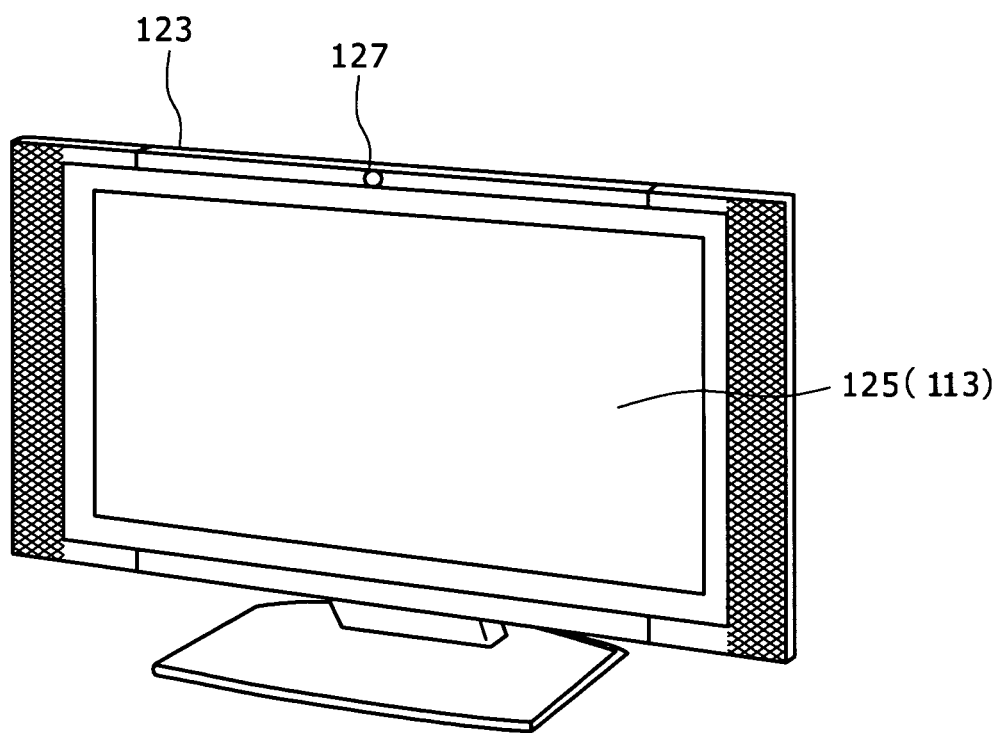
FIG. 33 is a diagram showing a product example of an electronic device.

FIG. 33 shows an example of an external appearance when the electronic device is a television receiver. The television receiver 121 has a structure in which a display screen 125 and a switching timing notifying device 127 are arranged in the front surface of a casing 123. The part of the display screen 125 in this case corresponds to the organic EL panel module described in the embodiment.

Figure 34:
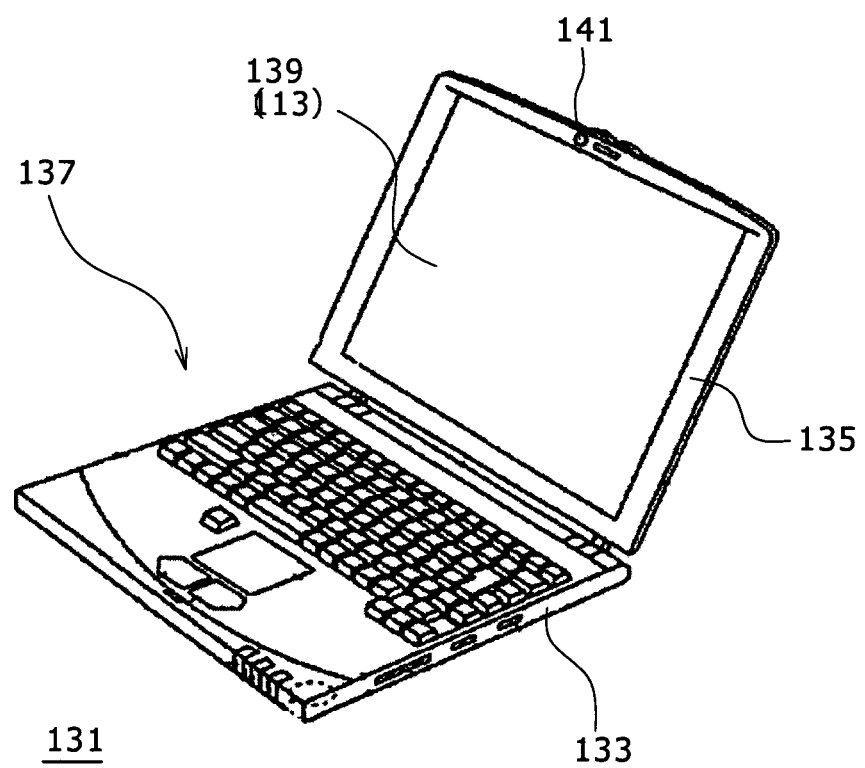
FIG. 34 is a diagram showing a product example of an electronic device.

In addition, for example a computer is assumed as an electronic device of this kind. FIG. 34 shows an example of external appearance of a notebook computer 131.

The notebook computer 131 includes a lower side casing 133, an upper side casing 135, a keyboard 137, a display screen 139, and a switching timing notifying device 141. Of these parts, the part of the display screen 139 in this case corresponds to the organic EL panel module described in the embodiment.

In addition to the above, a game machine, an electronic book, an electronic dictionary and the like are assumed as electronic devices.

(C-7) Examples of Other Display Devices

In the foregoing embodiment, description has been made of a case where the invention is applied to an organic EL panel module.

However, the configuration of the power supply system circuit described above can be applied also to other display panel modules of an emissive type.

For example, the configuration of the power supply system circuit can be applied to display devices having LEDs arranged in the form of a matrix and display panel modules having light emitting elements of a diode structure arranged on a screen. For example, the configuration of the power supply system circuit can be applied also to inorganic EL panels.

(C-8) Others

Various examples of modification of the foregoing embodiment can be considered without departing from the spirit of the invention. Various examples of modification and various examples of application created or combined on the basis of the description of the present specification can also be considered.

The present application contains subject matter related to that disclosed in Japanese Priority Patent Application JP 2008-204943 filed in the Japan Patent Office on Aug. 8, 2008, the entire content of which is hereby incorporated by reference.

What is claimed is:

1. A display panel module comprising:
   a pixel array section including a matrix of sub-pixels, each sub-pixel including a self-luminous element of a current-driven type and a pixel circuit configured to drive and control the self-luminous element;
   a signal line driving section, configured to drive a signal line connected to at least one of the sub-pixels;
   a writing control line driving section, configured to control writing of a potential appearing in the signal line to the at least one sub-pixel; and
   a power supply controlling section, configured to control and stop a supply of driving power to at least one sub-pixel, wherein
      the signal line driving section, the writing control line driving section, and the power supply controlling section are configured to operate at the same driving frequency when either of a two-dimensional image and a three-dimensional image is displayed;
      the signal line driving section, the writing control line driving section, and the power supply controlling section are configured to operate in accordance with a driving timing that prevents an overlap of display periods of adjacent frames when either of a two-dimensional and a three-dimensional image is displayed by the display panel module;
      the writing control line driving section controls the writing of a potential appearing in the signal line based on a first scan clock;
      the power supply controlling section controls the supply of the driving power in accordance with a lighting period of the self-luminous element of the at least one sub-pixel based on a second scan clock, a scan speed of the second scan clock being higher than a scan speed of the first scan clock; and
      the display periods include extinguishing periods arranged immediately before and after the lighting period to prevent a luminance difference.

2. The display panel module according to claim 1, wherein the matrix of sub-pixels include a set of horizontal lines,
   the waiting time of each horizontal line being a time range from a completion of the writing of the signal potential in that horizontal line to a start of lighting,
   a waiting time of a first horizontal line in which the writing of the signal potential is completed first is longest,
   a waiting time of a second horizontal line in which the writing of the signal potential is completed last is shortest, and
   a waiting time of each horizontal line positioned between said first horizontal line and said second horizontal line is configured linearly according to positional relation to the first horizontal line and the second horizontal line.

3. The display panel module according to claim 2, wherein a cycle of said first scan clock is set so as to coincide with a horizontal scanning cycle of the set of horizontal lines.

4. The display panel module according to claim 2, wherein the length of a lighting period of each horizontal line is 46% of one frame period.

5. The display panel module according to claim 2, wherein the waiting time of the second horizontal line is zero.

6. The display panel module according to claim 1, wherein the scan speed of the second scan clock being at least two times the scan speed of the first scan clock.

7. A semiconductor integrated circuit comprising:
   a single line driving section configured to drive and control a pixel array section including a matrix of sub-pixels, each sub-pixel including a self-luminous element of a current-driven type and a pixel circuit configured to drive and control the self-luminous element;
   a writing control line driving section configured to control writing of a potential appearing in a signal line to the at least one sub-pixel; and a power supply controlling section configured to and stop a supply of driving power to the at least one sub-pixel, wherein the signal line driving section, the writing control line driving section, and the power supply controlling section are configured to operate at the same driving frequency when either of a two-dimensional image and a three-dimensional image is displayed; and the signal line driving section, the writing control line driving section, and the power supply controlling section are configured to operate in accordance with a driving timing that prevents an overlap of display periods of adjacent frames when either of a two-dimensional and a three-dimensional image is displayed by the display panel module;

the writing control line driving section controls the writing of a potential appearing in the signal line based on a first scan clock; and the power supply controlling section controls the supply of the driving power in accordance with a lighting period of the self-luminous element of the at least one sub-pixel based on a second scan clock, a scan speed of the second scan clock being higher than a scan speed of the first scan clock; and the display periods include extinguishing periods arranged immediately before and after the lighting period to prevent a luminance difference.

8. A driving method of a pixel array section including a matrix of sub-pixels, each sub-pixel including a self-luminous element of a current-driven type and a pixel circuit configured to drive and control the self-luminous element, said driving method comprising:

driving a signal line connected to at least one sub-pixel of the matrix;

controlling a writing of a potential appearing in the signal line;

controlling and stopping a supply of driving power to the at least one sub-pixel;

operating the signal line driving section, the writing control line driving section, and the power supply controlling section at the same driving frequency when either of a two-dimensional image and a three-dimensional image is displayed; and operating the driving the signal line section, the controlling the writing of the potential appearing in the signal line, and the controlling and stopping the supply of driving power in accordance with a driving timing that prevents an overlap of display periods of adjacent frames when either of a two-dimensional image and a three-dimensional image is displayed;

operating the writing control line driving section to control the writing of a potential appearing in the signal line based on a first scan clock; and operating the power supply controlling section to control the supply of the driving power in accordance with a lighting period of the self-luminous element of the at least one sub-pixel based on a second scan clock, a scan speed of the second scan clock being higher than a scan speed of the first scan clock, wherein the display periods include extinguishing periods arranged immediately before and after the lighting period to prevent a luminance difference.

9. An electronic device comprising:

the display panel module according to claim 1; and a system control section that includes an operating input section and is configured to control operation of the electronic device, wherein the signal line driving section, the writing control line driving section, and the power supply controlling section are configured to operate at the same driving frequency when either of a two-dimensional image and a three-dimensional image is displayed; and the signal line driving section, the writing control line driving section, and the power supply controlling section are configured to operate in accordance with a driving timing that prevents an overlap of display periods of adjacent frames when either of a two dimensional and a three-dimensional image is displayed by the display panel module;

the writing control line driving section controls the writing of a potential appearing in the signal line based on a first scan clock;

the power supply controlling section controls the supply of the driving power in accordance with a lighting period of the self-luminous element of the at least one sub-pixel based on a second scan clock, a scan speed of the second scan clock being higher than a scan speed of the first scan clock; and the display periods include extinguishing periods arranged immediately before and after the lighting period to prevent a luminance difference.

10. The electronic device according to claim 9, wherein the system control section further includes a emitting transmission section configured to transmit a synchronization signal in accordance with the driving timing.

11. The electronic device according to claim 10, wherein the transmission section is an infrared light emitting section, and the synchronization signal is transmitted as an infrared light.

12. The electronic device according to claim 10, wherein the transmission section is configured to transmit the synchronization signal at least when the three-dimensional image is displayed by the display panel module.

13. The electronic device according to claim 10, wherein the system control section is configured to drive the display panel module to display the three-dimensional image of N frames/second on a screen at a rate of 2*N frames/second.

14. The electronic device according to claim 13, wherein N is 60.

* * * * *

UNITED STATES PATENT AND TRADEMARK OFFICE
CERTIFICATE OF CORRECTION

PATENT NO. : 9,066,093 B2
APPLICATION NO. : 12/458710
DATED : June 23, 2015
INVENTOR(S) : Hiroshi Hasegawa et al.

Page 1 of 1

It is certified that error appears in the above-identified patent and that said Letters Patent is hereby corrected as shown below:

Title page (56) Other Publications:

Please replace "2008-204942" with --2008-204943--

Please replace "2088-204943" with --2008-204943--

Signed and Sealed this
Twenty-first Day of June, 2016

Michelle K. Lee
*Director of the United States Patent and Trademark Office*